United States Patent
Arai et al.

(10) Patent No.: US 7,107,683 B2
(45) Date of Patent: *Sep. 19, 2006

(54) FORMING METHOD OF THROTTLE APPARATUS FOR INTERNAL COMBUSTION ENGINE

(75) Inventors: Tsuyoshi Arai, Kariya (JP); Naoki Hiraiwa, Toyokawa (JP); Masami Goto, Kasugai (JP); Katsuya Torii, Anjo (JP); Hiroki Shimada, Obu (JP)

(73) Assignee: Denso Corporation, (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/983,307

(22) Filed: Nov. 8, 2004

(65) Prior Publication Data

US 2005/0097745 A1    May 12, 2005

(30) Foreign Application Priority Data

Nov. 7, 2003 (JP) .............................. 2003-379209
Mar. 31, 2004 (JP) .............................. 2004-106107

(51) Int. Cl.
*B21K 1/22* (2006.01)
*B29C 45/00* (2006.01)

(52) U.S. Cl. ............... 29/898.4; 29/888.45; 29/888.46; 29/527.1; 264/242; 264/328.8; 264/260

(58) Field of Classification Search ............... 29/888.4, 29/888.45, 888.46, 527.1; 264/242, 328.8, 264/328.18, 334, 275, 260; 425/812, 573
See application file for complete search history.

(56) References Cited

U.S. PATENT DOCUMENTS 3,675,888 A * 7/1972 Scaramucci .................. 249/57
5,304,336 A   4/1994 Karlsson et al.
5,794,591 A * 8/1998 Kalebjian et al. ............ 123/337
5,919,492 A * 7/1999 Tarr et al. .................... 425/144
6,288,534 B1* 9/2001 Starkweather et al. ... 324/207.2
2002/0163106 A1* 11/2002 Hendry ........................ 264/500
2004/0129253 A1* 7/2004 Ozeki et al. ................. 123/399
2005/0022365 A1   2/2005 Arai et al.
2005/0022781 A1   2/2005 Arai et al.
2005/0022786 A1   2/2005 Arai et al.
2005/0022787 A1   2/2005 Arai et al.
2005/0097743 A1   5/2005 Arai et al.
2005/0097744 A1   5/2005 Arai et al.
2005/0120556 A1   6/2005 Arai et al.

FOREIGN PATENT DOCUMENTS

DE      101 05 526 A1    8/2002
GB      EP23133 A1 *     1/1981
JP      2000-202866      7/2000

* cited by examiner

*Primary Examiner*—David P. Bryant
*Assistant Examiner*—Sarang Afzali
(74) *Attorney, Agent, or Firm*—Nixon & Vanderhye PC

(57) ABSTRACT

A molding dies have a first shaft holding portion and a second shaft holding portion. The first shaft holding portion supports an outer surface of a metal shaft which is exposed between an axial end surface of the throttle valve and a first collar molded in the throttle body. The second shaft holding portion supports an outer surface of the metal shaft which is exposed between the other axial end surface and a second collar molded in the throttle body. The first and the second collar have a first and second shaft holes into which the metal shaft is inserted. The first and the second holding portions restrict a flowing of melted resin into the first and the second shaft holes.

15 Claims, 17 Drawing Sheets

FORMING METHOD OF THROTTLE APPARATUS FOR INTERNAL COMBUSTION ENGINE

CROSS REFERENCE TO RELATED APPLICATION

This application is based on Japanese Patent Applications No. 2003-379209 filed on Nov. 7, 2003, and No. 2004-106107 filed on Mar. 31, 2004, the disclosure of which are incorporated herein by reference.

FIELD OF THE INVENTION

The present invention relates to a forming method of a throttle apparatus for an internal combustion engine mounted in a vehicle. Especially, the present invention relates to an injection molding method of a throttle apparatus, in which a throttle valve and a throttle body are substantially simultaneously formed in the same dies.

BACKGROUND OF THE INVENTION

In an electrically controlled throttle apparatus, a driving device such as a motor controls an opening degree of a throttle valve in accordance with a position of an accelerator pedal stepped by a driver. The throttle apparatus made from a resin material is introduced to enhance the fuel economy, to reduce the weight and to reduce the cost. FIG. 19 shows the throttle apparatus made from the resin, which comprises a throttle body 101 forming an intake manifold, throttle vale 102 adjusting an air amount flowing through the throttle body 101, a throttle shaft 103 supporting the throttle valve 102, a power unit biasing the throttle valve 102 in opening direction, and a coil spring 105 biasing the throttle valve 102 in closing direction. An engine control device controls the power unit in order to adjust the opening degree of the throttle valve 102 according to a position of an accelerator pedal stepped by a driver.

The power unit comprises a driving motor 106 and a power transmitting device (reduction gears). The reduction gears include a pinion gear 110 which is connected with a motor shaft 109 of the driving motor 106, an intermediate gear 111 which engages with the pinion gear 110, and a valve gear 112 which engages with the intermediate gear 111. A throttle opening sensor is provided on an outer surface of the throttle body 101. The throttle opening sensor includes a permanent magnet 113 disposed inner surface of the valve gear 112, and a magnetic detector 114 which generates an electromotive force according to a magnetic field generated by the permanent magnet 113. The valve gear 112 is connected with one end of the throttle shaft 103. The magnetic detector 114 is a non-contact type detector and is disposed in a sensor holding portion 116 of a sensor cover 115 in such a manner that the magnetic detector 114 confronts to an inner surface of a yoke.

FIG. 20 shows a throttle apparatus of which throttle valve is driven by the driving motor. When the throttle valve is closed, an air tightness of the throttle valve depends on the clearance gap between an inner surface of the tubular throttle body 101 and an outer periphery of the throttle valve 102.

Conventionally, the throttle body 101 and the throttle valve 102 are independently manufactured in each different process. Subsequently, a manufactured throttle valve 102 is combined with a manufactured throttle body 101 in accordance with an inner peripheral dimension of the manufactured throttle body 101 in a downstream process. Alternatively, a manufactured throttle body 101 is combined with a manufactured throttle valve 102 in accordance with an outer circumferential dimension of the throttle valve 102 in a downstream process. Thus, a predetermined clearance is obtained between the bore inner periphery of the throttle body 101 and the outer circumferential periphery of a throttle valve 102. A throttle shaft 103 integrally rotates with the throttle valve 102. Both of the ends of the throttle shaft 103 are rotatably supported by cylindrical bearings 104 provided in the throttle body 101.

U.S. Pat. No. 5,304,336, which is a counterpart of JP-5-141540A, shows molding methods in which a manufacturing process of the throttle body and the throttle valve is reduced. In the molding methods, the throttle body 101 and the throttle valve 102 shown in FIG. 21 are integrally molded of a resinous material in the same molding dies. At first, the substantially tubular throttle body 101 is integrally molded of a resinous material. Subsequently, inner periphery (bore inner periphery) of the throttle body 101 is used as a part of a molding die molding the throttle valve 102, and the throttle valve 102 is molded. Thus, a shape of an outer circumferential periphery of the throttle valve 102 is adapted to a shape of the bore inner periphery of the throttle body 101 in the above molding methods.

The molded throttle body 101 is gradually cooled in the body cavity to be solidified. Subsequently, the movable die is slid forward in order to form a valve cavity, into which a resinous material is filled. The throttle valve 102 is molded of a resinous material in the throttle body 101.

However, in the above molding methods of the throttle valve 102, the throttle body 101 is molded of a resinous material while the molded throttle body 101 is restricted by dies in its radial direction and in its substantially circumferential direction. Thus, the throttle valve 102 is molded of a resinous material while the throttle body 101 and the throttle valve 102 are restricted by the dies. The throttle body 101 and the throttle valve 102 are taken out of the dies, and gradually cooled. In this cooling period, the unrestricted throttle body 101 and the throttle valve 102 are contracted. The throttle body 101 and the throttle valve 102 are deformed. Accordingly, it is difficult to maintain the clearance in a predetermined dimension between the inner periphery of the throttle body 101 and the outer circumferential periphery of the throttle valve 102.

A practical use of the throttle apparatus releases an internal stress, by which the apparatus is deformed. When the throttle apparatus is made from a crystal resin and is crystallized, the apparatus is deformed due to the crystallization thereof. Even the apparatus is annealed or aged, the throttle body 101 and the throttle valve 102 are deformed individually.

To solve the above problem, the inventors filed Japanese patent application No. 2003-285434 on Aug. 1, 2003. In this application, the throttle valve and throttle body is formed in a same die in such a manner that the throttle valve 102 is opened in a predetermined angle. A metal shaft is insert molded in a resin shaft of the throttle valve, and a first collar and a second collar are insert molded in the bore wall to support the both ends of the metal shaft. If a melted resin is introduced between the outer surface of the metal shaft and the inner surface of the collar during molding, the metal shaft hardly rotate in the collar. That is, the throttle valve may hardly rotate in the throttle body 101.

When the center axes of the first and the second collar deviate from each other, the throttle valve may hardly rotate in the throttle valve smoothly.

SUMMARY OF THE INVENTION

An object of the present invention is to provide a forming method of the throttle apparatus in which a predetermined clearance is maintained between the inner periphery of the throttle body and the outer periphery of the throttle valve, and in which the deformation of the throttle valve is avoided. The other object of the present invention is to provide a forming method of the throttle apparatus in which the melted resin is restricted from flowing into a gap clearance between an outer surface of the shaft and inner surface of inserted parts According to the present invention, a forming method of a throttle apparatus for an internal combustion engine is conducted as follows.

At first, clamping a pair of molding dies to form a body cavity and a valve cavity therein, the body cavity being for molding a throttle body and the valve cavity being for molding a throttle valve. Next, injecting a melted material into the body cavity and the valve cavity is carried out. Next, moving a die away from the other die in order to eject a solidified molding is carried out. A rotational shaft rotating with the throttle valve is insert molded in the throttle valve. An insert part rotatably supporting an end of the rotational shaft is insert molded in the throttle body. A shaft holding portion supporting the rotational shaft is provided in the molding dies. The shaft holding portion is continuously contact with the outer surface around the rotational shaft between an axial end of the throttle valve and the insert part.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

An embodiment of the present invention will be described hereinafter with reference to the drawings.

(First Embodiment)

Figure 1:
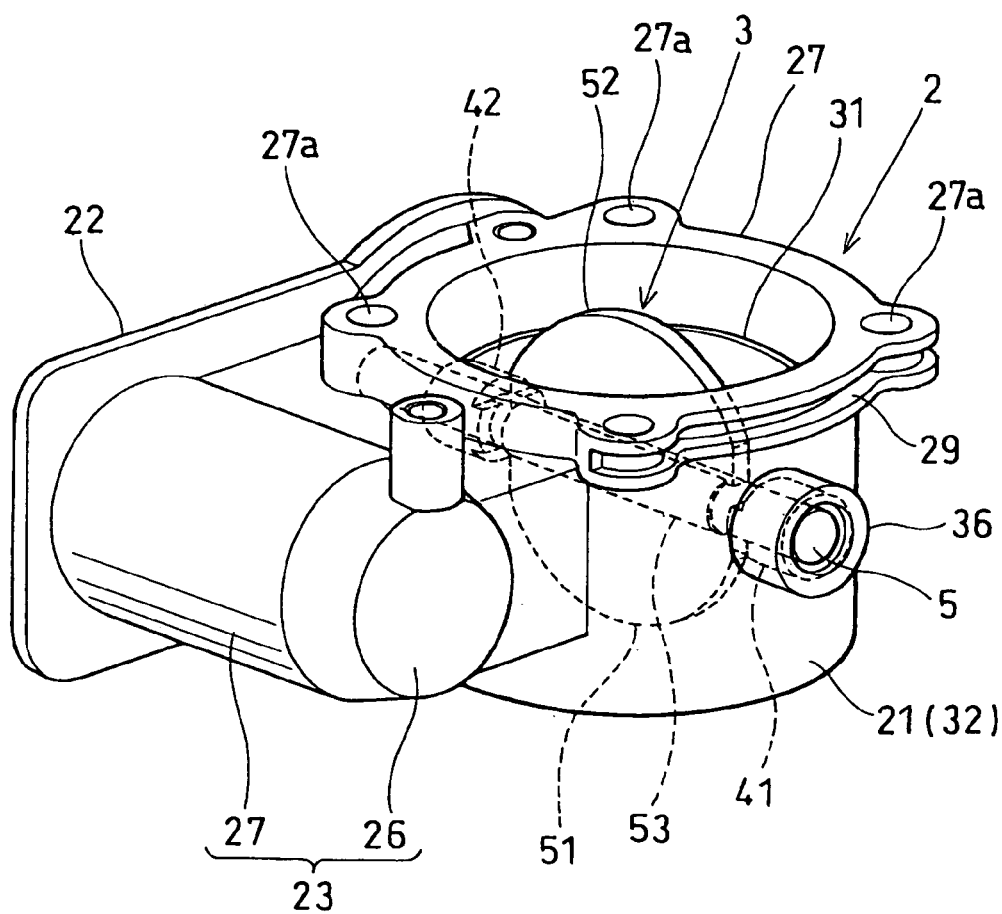
FIG. 1 is a perspective view of a resin molding according to a first embodiment of the present invention.
Figure 2:
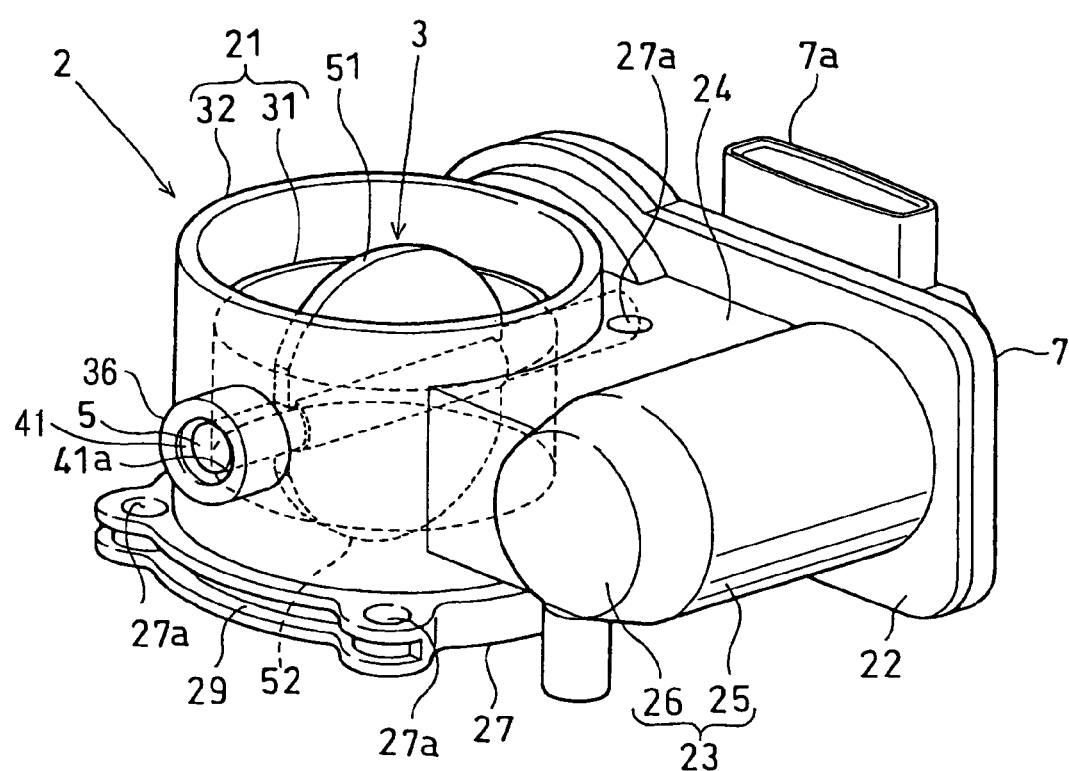
FIG. 2 is a perspective view of a throttle apparatus according to the first embodiment.
Figure 3:
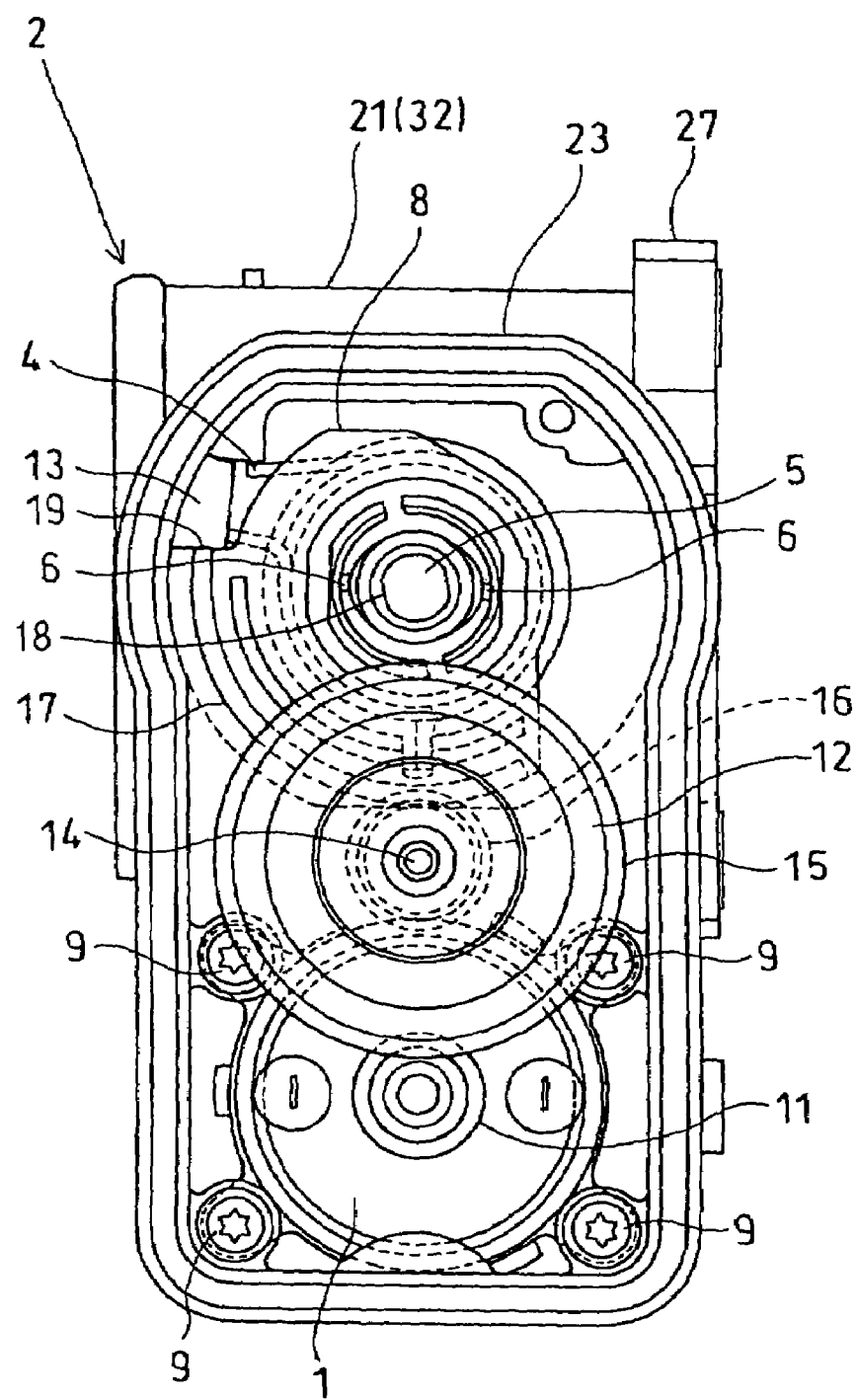
FIG. 3 is a front view showing an inside of a gearbox according to the first embodiment.
Figure 4:
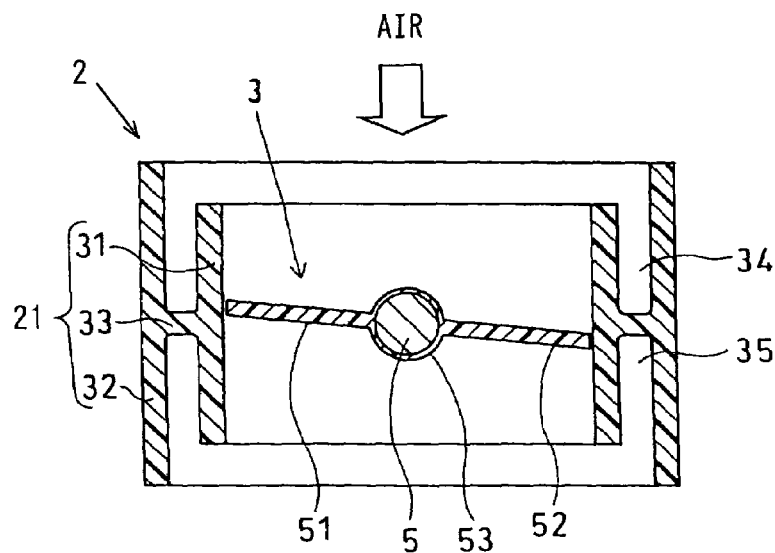
FIG. 4 is a cross sectional view of a double-piped bore wall according to the first embodiment.

Referring to FIGS. 1 to 8, a first embodiment of the present invention is described. FIG. 1 shows a molding products and FIG. 2 shows a throttle apparatus. FIG. 3 shows a power unit which drives the throttle valve, FIG. 5A shows one end part of the throttle valve, and FIG. 5B shows a first and a second collar.

The throttle control apparatus has a driving motor 1, a throttle body 2, a throttle valve 3, a coil spring 4, and an electronic control unit which is referred to as ECU hereinafter. The driving motor 1 functions as a power source. The throttle body 2 forms a part of intake passage communicated with each cylinder of an internal combustion engine. The throttle valve 3 controls an amount of intake air flowing into the engine through the throttle body 2. The coil spring 4 urges the throttle valve 3 in the close direction. The ECU electrically controls the opening degree of the throttle valve 3 according to an operation degree (accelerator operation amount) of an accelerator pedal stepped by a driver.

The ECU is electrically connected with an accelerator position sensor (not shown) which converts the accelerator operation amount into an accelerator position signal. The accelerator position signal represents the accelerator operation amount. The electrically controlled throttle apparatus has a throttle position sensor that converts an opening degree of the throttle valve 3 into an electronic signal (throttle position signal) in order to output the throttle position signal to the ECU. The throttle position signal represents an opening degree of the throttle valve 3. The ECU performs PID (proportional, integral and differential [derivative]) feedback control with respect to the driving motor 1 in order to eliminate deviation between the throttle position signal transmitted from the throttle position sensor and the accelerator position signal transmitted from the accelerator position sensor.

The throttle position sensor is constructed with permanent magnets 6, yokes (not shown), a Hall effect device (not shown), a terminal (not shown), a stator (not shown) and the like. The permanent magnets 6 are separated rectangular magnets used for generating a magnetic field. The yokes are constructed with separated substantially arc-shaped pieces, and are magnetized by the permanent magnets 6. The Hall element device is integrally provided with a sensor cover 7 to be opposed to the separated permanent magnets 6. The stator is made of a ferrous metallic material for concentrating magnetic flux into the hall element. The separated permanent magnets 6 and the separated yokes are secured to the inner periphery of a valve gear 8, which constructs the reduction gears, using glue or the like.

The sensor cover 7 is formed of a resinous material such as thermoplastic resin in a predetermined shape, in order to electrically insulate between terminals of the throttle position sensor and power-supply terminals of the driving motor 1. The sensor cover 7 has an engaging part that engages with a corresponding engaged part, which is formed on the opening side of the gearbox part 22 of the throttle body 2, each other. The engaging part of the sensor cover 7 and the engaged part of the gearbox part 22 are connected using a rivet, a screw (not shown), or are thermally swaged with each other. A cylindrical shaped receptacle 7a is integrally molded with the sensor cover 7 to be connected with an electrical connector (not shown).

A driving unit rotating the throttle valve 3 in the opening or closing direction includes the driving motor 1, and a reduction gear which transmits the driving force of the driving motor 1 to the throttle valve 3 through a metal shaft 5. The driving motor 1 is connected with terminals which are provided in the sensor cover 7. The driving motor 1 is fixed on the throttle body 2 with a screw 9.

The reduction gears reduce rotation speed of the driving motor 1 by a predetermined reduction gear ratio. The reduction gears (valve driving means, power transmission unit) is constructed with a pinion gear 11, a middle reduction gear 12 and the valve gear 8 for driving the metal shaft 5 that rotates the throttle valve 3. The pinion gear 11 is secured to the outer periphery of the motor shaft of the driving motor 1. The middle reduction gear 12 engages with the pinion gear 11 to be rotated by the pinion gear 11. The valve gear 8 engages with the middle reduction gear 12 to be rotated by the middle reduction gear 12.

The pinion gear 11 is made of a metallic material, and is integrally formed with the motor shaft of the driving motor 1 to be in a predetermined shape, so that the pinion gear 11 serves as a motor gear that integrally rotates with the motor shaft of the driving motor 1. The middle reduction gear 12 is formed to be in a predetermined shape of a resinous material, and is rotatably provided onto the outer periphery of the supporting shaft 14 that serves as a rotation center of the middle reduction gear 12. The middle reduction gear 12 is constructed with a large gear part 15, which engages with the pinion gear 11 of the motor shaft, and a small gear part 16 that engages with the valve gear 8. The supporting shaft 14 is integrally molded with the bottom wall of the gearbox part 22 of the throttle body 2. An end part of the supporting shaft 14 engages with a recess portion formed in the inner wall of the sensor cover 7.

The valve gear 8 is integrally molded to be in a predetermined substantially cylindrical shape of a resinous material. Gear teeth (teeth part) 17 are integrally formed in the outer periphery of the valve gear 8 to engage with the small gear part 16 of the middle reduction gear 12. The valve gear 8 includes an engaging hole at the center thereof as shown in FIG. 3, the engaging hole being engaged with one end of the metal shaft 5. The metal shaft 5 and the engaging hole of the valve gear 8 respectively have width across flat portion 18 to define the relative angle of the throttle valve 3 and the metal shaft 5 relative to the valve gear 8, and to restrict relative rotation between the metal shaft 5 and the valve gear 8. The metal shaft 5 is connected with the one end of the metal shaft 5 by riveting the protruding portion of the metal shaft 5 from the engaging hole.

The outer periphery of the cylindrical part (spring inner periphery guide) of the valve gear 8 supports the diametrically inner periphery of the coil spring 4. A full-close stopper portion 19 is integrally formed with the valve gear 8 on one end plane in the outer circumferential periphery of the valve gear 8, i.e., the gear teeth 17. The full-close stopper portion 19 hooks to the full-close stopper 13 of the gearbox part 22, when the throttle valve 3 is in the idling position, i.e., full close position.

The throttle body 2 is a throttle housing that includes the substantially cylindrical-shaped bore wall part 21 internally forming a circular-shaped intake passage, through which intake air flows into the engine. The bore wall part 21 internally receives the disc-shaped throttle valve 3, such that the throttle valve 3 can open and close the circular-shaped intake passage of the bore wall part 21. The bore wall part 21 rotatably receives the throttle valve 3 in the intake passage (bore), such that the throttle valve 3 can rotate from the full close position to the full open position. The throttle body 2 is screwed onto an intake manifold of the engine using a fasting bolt or a screw (not shown).

The bore wall part 21 of the throttle body 2 is formed in a predetermined shape that has a double-pipe structure, in which a substantially cylindrical-shaped bore outer pipe 32 is arranged on the diametrically outer side of a substantially cylindrical-shaped bore inner pipe 31. The bore inner pipe 31 is an internal side cylindrical part that forms an internal periphery. The bore outer pipe 32 is an external side cylindrical part that forms an outer member. The bore wall part 21 of the throttle body 2 is made of a thermoplastic resin, such as PPS, PA, PP or PEI. The bore inner pipe 31 and the bore outer pipe 32 have an intake-air inlet part (air intake passage) and an intake-air outlet part (air intake passage). Intake air drawn from an air cleaner (not shown) passes through an intake pipe (not shown), the intake-air inlet part and the intake-air outlet part of the bore wall part 21. Subsequently, the intake air flows into a surge tank of the engine or the intake manifold. The bore inner pipe 31 and the bore outer pipe 32 are integrally molded with each other. The bore inner pipe 31 and the bore outer pipe 32 have a substantially the same inner diameter and a substantially the same outer diameter along with the intake airflow direction, i.e., the direction from the upper side to the lower side in the vertical direction of FIG. 2.

The bore inner pipe 31 internally has an air intake passage, through which intake air flows to the engine. The throttle valve 3 and the metal shaft 5 are rotatably provided in the air intake passage of the bore inner pipe 31. A cylindrical space (annular space) is formed between the bore inner pipe 31 and the bore outer pipe 32, and the cylindrical space is circumferentially blocked, i.e., partitioned, by an annular connecting part 33 at a substantially longitudinally central section thereof. For instance, the substantially longitudinally central section of the cylindrical space is a section along with a circumferential direction of the throttle valve 3 in the full close position. Namely, the substantially longitudinally central section is a circumferential section of the bore wall part 21 passing through the axial center of the throttle shaft. The annular connecting part 33 connects the outer periphery of the bore inner pipe 31 and the inner periphery of the bore outer pipe 32, such that the annular connecting part 33 blocks substantially entirely over the circumferential area of the cylindrical space formed between the bore inner pipe 31 and the bore outer pipe 32.

The cylindrical space between the bore inner pipe 31 and the bore outer pipe 32 located on the axially upstream side with respect to the annular connecting part 33 serves as a blockade recess part (moisture trapping groove) 34 for blocking moisture flowing along with the inner periphery of the intake pipe toward the intake manifold. The cylindrical space between the bore inner pipe 31 and the bore outer pipe 32 located on the axially downstream side with respect to the annular connecting part 33 serves as a blockade recess part (moisture trapping groove) 35 for blocking moisture flowing along with the inner periphery of the intake manifold.

The motor housing part 23, which receives the driving motor 1, is integrally molded of the resinous material with the bore wall part 21 via connecting portion 24 to construct the throttle body 2. The motor housing part 23 is arranged in parallel with the bore wall part 21. That is, the motor housing part 23 is in parallel with the bore wall part 21 with respect to the gearbox part 22 in the throttle body 2. The motor housing part 23 is arranged on the radially outer side of the bore outer pipe 32. The motor housing part 23 is integrally molded of the resinous material with the gearbox part 22. Specifically, the motor housing part 23 is integrally molded with the end face of the gearbox part 22 located on the right side in FIG. 2. The gearbox part 22 has a chamber for rotatably receiving the reduction gears. The motor housing part 23 has a substantially cylindrical sidewall part 25 and a substantially circular shaped bottom wall part 26. The sidewall part 25 extends from the right side face of the gearbox part 22 in the left direction in FIG. 2. The bottom wall part 26 plugs the opening side of the sidewall part 41 on the left side in FIG. 2. The central axis of the sidewall part 25 of the motor housing part 23 is arranged substantially in parallel with the axis of the metal shaft 5, i.e., rotation axis of the throttle valve 3. Besides, the central axis of the sidewall part 25 of the motor housing part 23 is arranged substantially perpendicularly to the central axis of the bore inner pipe 31 of the bore wall part 21.

The bore outer pipe 32 has a stay 27 at the opening end thereof. The stay 27 is a ring shaped portion which is integrally formed and is radially extending from the bore outer pipe 32*a*. The stay 27 is for fixing the throttle apparatus on the intake manifold and has a plurality of through hole 27*a* through which bolts are inserted. The stay 27 has an undercut portion 29 which communicates with some of the through hole 27*a*.

Referring to FIG. 2, the bore inner pipe 31 and the bore outer pipe 32 has the substantially cylindrical first valve bearing 36 and the substantially cylindrical second valve bearing (not shown) that are integrally molded of a resinous material. The first valve bearing 36 rotatably supports the first bearing sliding part of the metal shaft 5. The second valve bearing rotatably supports the second bearing sliding part of the metal shaft 5. A plug (not shown) is provided on the first valve bearing 36 for plugging the opening side of the first valve bearing 36. The second valve bearing is integrally molded with the bore wall part 21, i.e., bottom wall of the gearbox part 22 of the throttle body 2, to be protruded in the right direction in FIG. 2. The outer periphery of the second valve bearing serves as a spring inner periphery guide (not shown) for supporting the diametrically inner periphery of the coil spring 4.

A first insert part 41, which is referred to as a first collar 41 hereinafter, is insert molded in the first valve bearing 36 in such a manner that inner end of the first collar 41, as shown in FIG. 1, is exposed in the intake passage. A second insert part 42, which is referred to as a second collar 42, is insert molded in the second valve bearing 37 in such a manner that the inner end of the second collar 42 is exposed in the intake passage. The first collar 41 and the second collar 42 are made from a material which is not melted and mixed and is not adhesive to the resin material (thermoplastic resin) of the throttle valve 3 and the throttle body 2, such as brass, oilless metal and cupper.

Figure 5A:
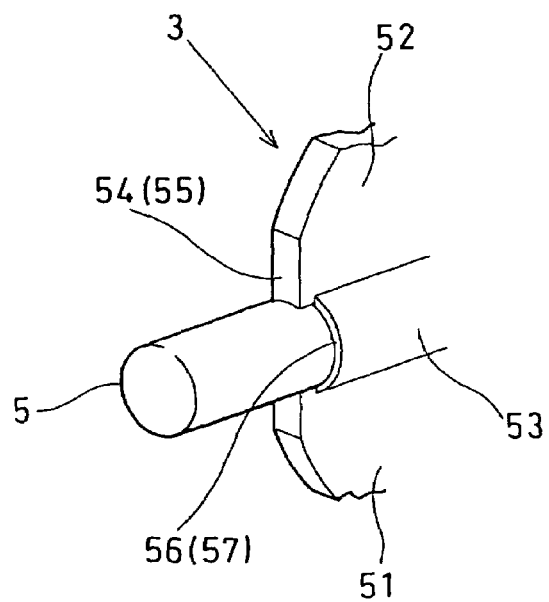
FIG. 5A is a perspective view showing partially a throttle valve according to the first embodiment.
Figure 5B:
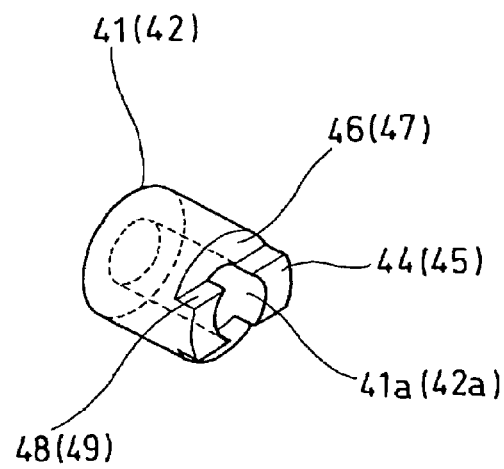
FIG. 5B is a perspective view of the first and the second collars according to the first embodiment.

As illustrated in FIG. 1 and FIG. 5B, the first and the second collars 41, 42 respectively have a first and a second shaft holes 41*a*, 42*a* which penetrate the centerlines of the first and the second collars 41, 42. Both ends of the metal shaft 5 are respectively rotatably supported in the first and the second shaft holes 41*a*, 42*a*. The first and the second collars 41, 42 respectively have a first seal portion 44 and the second seal portion 45, which protrude toward the throttle valve 3. The first and the second collars 41, 42 respectively have a first concave portion 46 and a second concave portion 47, which are concaved radially outwardly with respect to the throttle valve 3.

The first and the second seal portions 44, 45 and the first and the second concave portions 46, 47 respectively have flat surfaces which are perpendicular to the rotational axis of the throttle valve 3. The flat surfaces confront to outer ends of the rotational shaft of the throttle valve 3 in a predetermined distance when the throttle valve 3 is in almost full closed position. A first and a second step portions 48, 49 are formed between the seal portions 44,45 and the concave portions 46, 47, the step portions 48, 49 having flat surfaces which are parallel to the rotational axis of the throttle valve 3. The coil spring 4 is a return spring one end of which is engaged with a body-side hook (not shown) disposed at a bottom surface of the gear box part 22, the other end of which is engaged with a gear-side hook (not shown) disposed at the side-surface of the valve gear 8.

The throttle valve 3 is a butterfly valve of which axis is substantially orthogonal to the center axis of the bore wall part 21. The opening position of the throttle valve is varied from a full-opening position to a full-closing position to control the air amount which is introduced into the engine. The throttle valve 3 is comprised of a first semicircle plate 51, a second semicircle plate 52, a cylindrical resin shaft 53, and the metal shaft 5. The first and the second semicircle plates 51, 52 are made of a thermoplastic synthetic resin, such as PPS, PA, PP, and PEI. When the first and the second semicircle plates 51, 52 are fixed on the cylindrical resin shaft 53, the first and the second semicircle plates 51, 52 form a resin disc.

When the throttle valve 3 is in the full-opening position, the first semicircle plate 51 is positioned upper side of the bore wall part 21 and the second semicircle plate 52 is positioned lower side of the bore wall part 21 with respect to the resin shaft 53. The first and the second semicircle plate 52 are provided with stiffening ribs on the one side or both sides thereof. The resin shaft 53 is integrally molded with the metal shaft 5, by which the throttle valve 3 and the metal shaft 5 are integrated to rotate together.

The metal shaft 5 is a throttle shaft made of a metallic material such as brass or stainless steel to be in a round-bar shape. The axis of the metal shaft 5 is arranged to be in a direction substantially perpendicular to a central axis of the bore wall part 21 of the throttle body 2, and is arranged to be in a direction substantially parallel to the central axis of a motor housing part 23. In this embodiment, the metal shaft 5 has a valve supporting portion for supporting the resinous shaft 53. The metallic valve supporting portion is insert molded inside of the resin shaft part 53 to reinforce the first and the second semicircle plates 51, 52 and the resin shaft 53. one end portion of the metal shaft 5 on the left side end in FIG. 2 exposes (protrudes) from one end face of the resin shaft 53 in order to serve as a first bearing sliding part that rotatably slides in a first shaft hole 41a of the first collar 41 disposed in the first valve bearing 36. The other end portion of the metal shaft 5 on the right side end in FIG. 2 exposes (protrudes) from the other end face of the resin shaft 53 in order to serve as a second bearing sliding part that rotatably slides in a second shaft hole 42a of the second collar 42 disposed in the second valve bearing (not shown).

An annular clearance between the metal shaft 5 and first shaft hole 41a, and an annular clearance between the metal shaft 5 and the second shaft hole 42a have width of 10 μm to 20 μm in order that the metal shaft 5 can rotate in the first and the second collars 41, 42. The right end of the metal shaft 5 in FIG. 2 is connected with the valve gear 8, which is one of elements of the reduction gear.

As shown in FIGS. 1 and 5, the throttle valve 3 has seal surfaces 54, 55 at the axial ends of the rotational axis thereof. When the throttle valve 3 is almost closed, the seal surfaces 54, 55 confront to the first and the second concave portions 46, 47 through a predetermined clearance, and the seal surfaces 54, 55 are slidablly in contact with the seal portions 44, 45. The seal surfaces 54, 55 construct valve joint structures, which include flat surfaces being perpendicular to the rational axis of the throttle valve 3.

The resin shaft 53 has substantially annular ends 56, 57. The annular ends 56, 57 construct valve joint structures, which are recessed from the seal surfaces 54, 55. When the throttle valve is almost closed, the annular ends 56, 57 confront to the seal portions 44,45 through a predetermined clearance.

Figure 6:
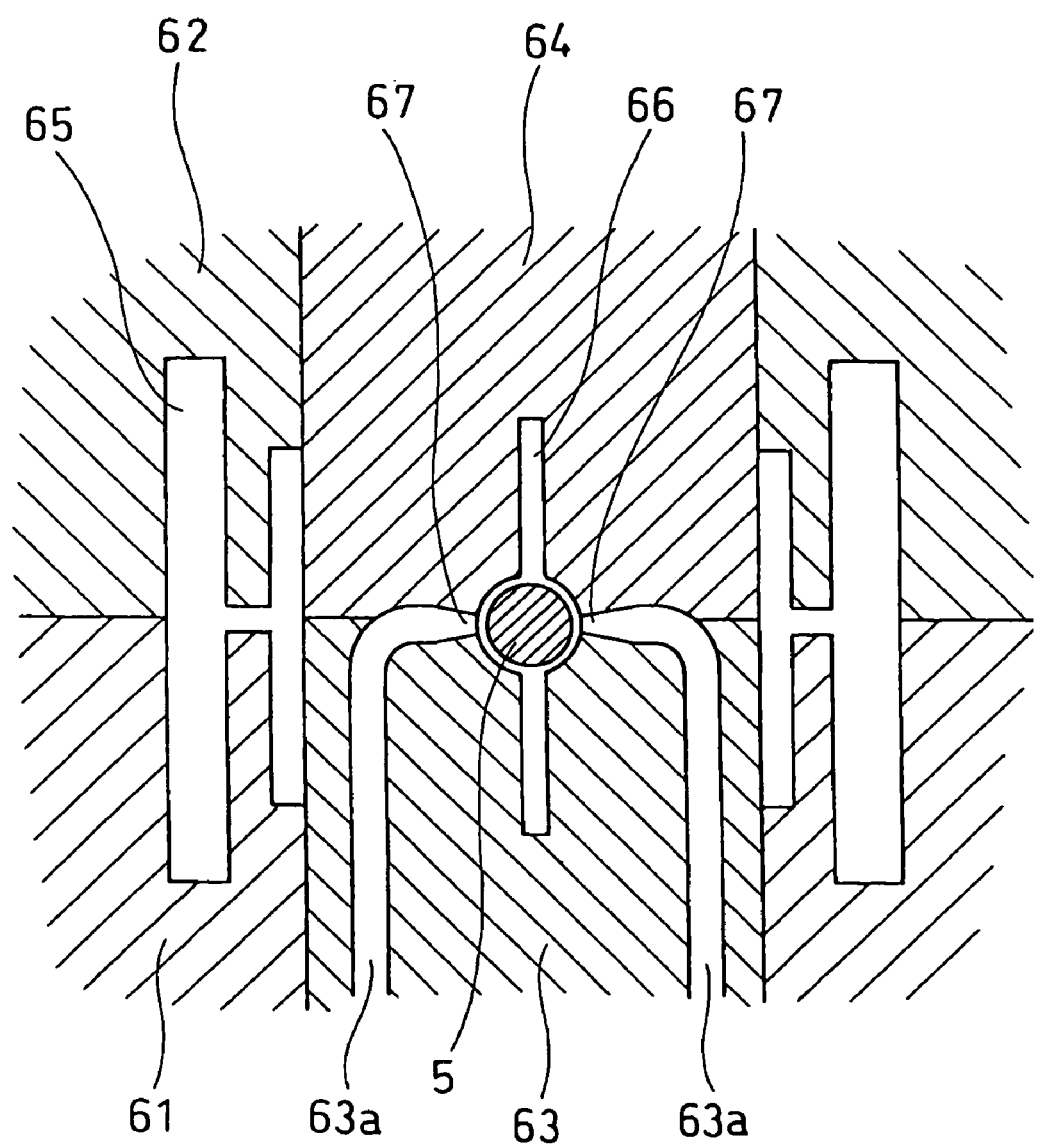
FIG. 6 is a cross sectional view of the molding dies according to the first embodiment.
Figure 7A:
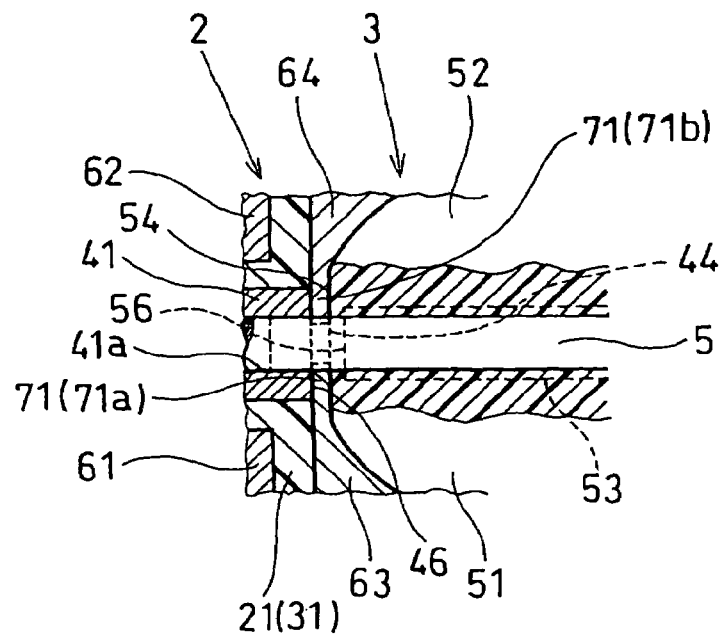
FIG. 7A and FIG. 7B are cross sectional view of the first and the second shaft holding portion according to the first embodiment.
Figure 7B:
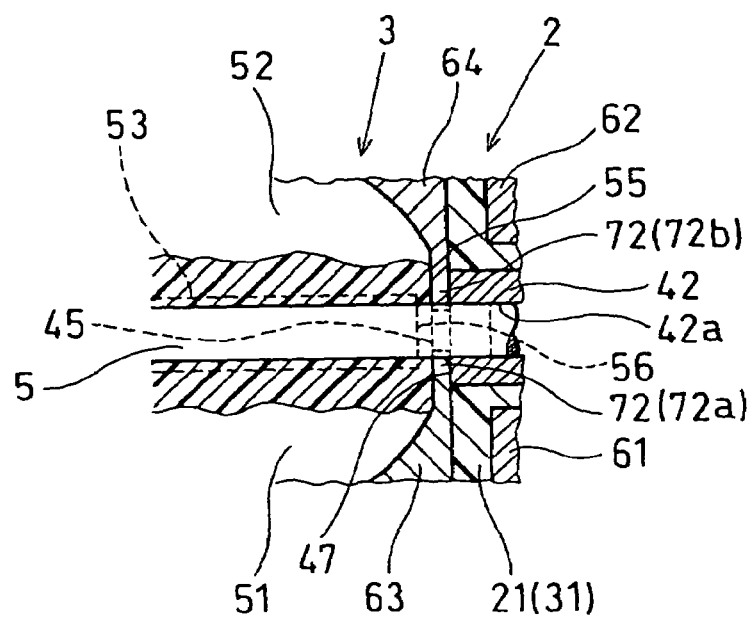
Figure 8:
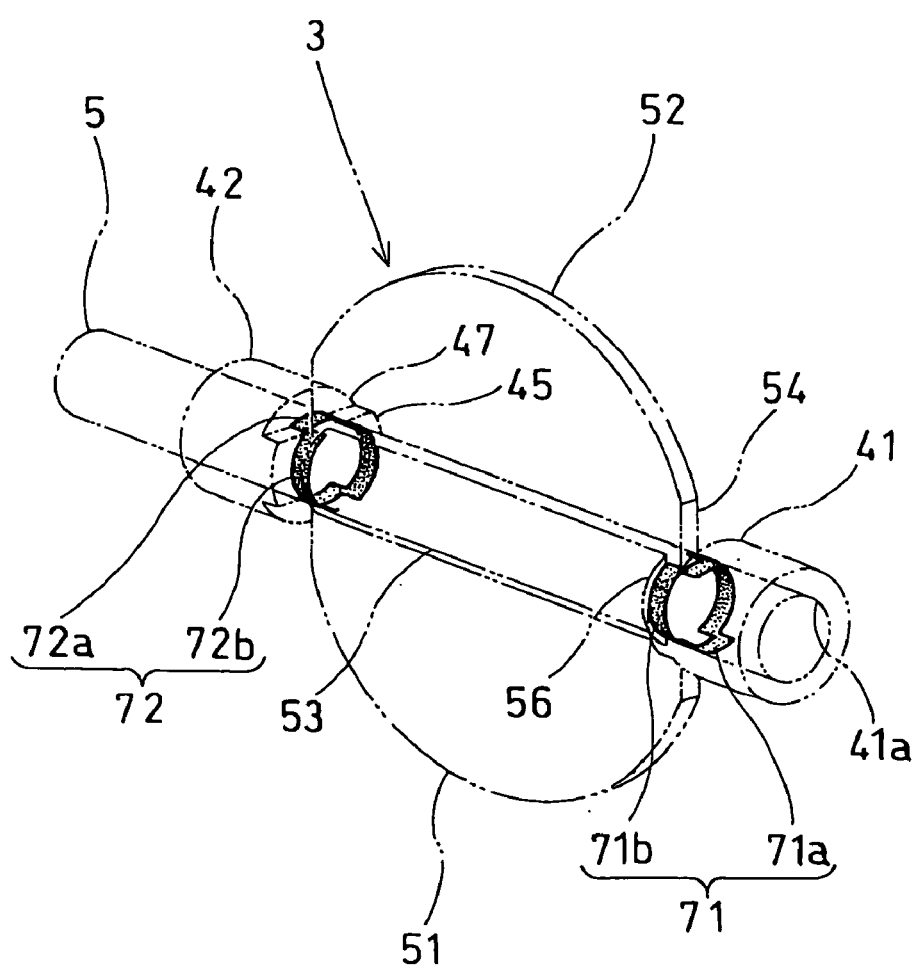
FIG. 8 is a perspective view showing the first and the second shaft holding portion according to the first embodiment.

Referring to FIGS. 1 to 8, the forming method of the throttle apparatus is described hereinafter. FIG. 6 is a cross sectional view of the dies, FIG. 7A and FIG. 7B are cross sectional view of the first and the second shaft holding portions, and FIG. 8 is a perspective view for showing the first and the second shaft holding portions of the resin molding dies.

The resin molding dies comprises a fixed die 61 and a movable die 62 which is displaceable upwardly and downwardly relative to the fixed die 61. The fixed die 61 includes a first insert die 63, and the movable die 62 includes a second insert die 64. A parting line of the fixed die 61 and the movable die 62 is arranged on the rotational axis of the throttle valve 3. The first insert die 63 and the second insert die 64 are symmetrically disposed with respect to the rotational axis of the throttle valve 3.

When the molding dies are closed, a body cavity 65 is formed between the fixed die 61, the movable die 62, and the first and the second insert dies 63, 64. The body cavity 65 comprises a first body cavity corresponding to the double-piped boar wall 21, a second body cavity corresponding to the gearbox part 22, and a third body cavity corresponding to the motor housing 23 and the connecting portion 24.

When the molding dies are closed, a valve cavity 66 is formed, between the first insert die 63 and the second insert die 64. The valve cavity 66 comprises a first valve cavity corresponding to the first semi-circle plate 51, and a second valve cavity corresponding to the second semi-circle plate 52. The first valve cavity includes a first shaft cavity corresponding a lower half of the resin shaft 53.

The first and the second collars 41, 42 are insert molded in the first and the second collar holding portions which are provided in the fixed die 61 and the movable die 62.

The both ends of the metal shaft 5 function as a first and a second sliding portions which are supported by the first and the second valve bearing 36, 37. The center portion of the metal shaft 5 functions as a valve holding portion which holds the resin shaft 53 of the throttle valve 3. The exposed portions of the metal shaft 5 is supported the first and second shaft holding portions 71, 72 while the throttle valve 3 and the throttle body 2 are substantially simultaneously molded in the same dies.

As illustrated in FIGS. 7A and 8, the first shaft holding portion 71 is disposed between the throttle valve 3 and the first collar 41, which holds the exposed portion of the metal shaft 5. The first shaft holding portion 71 comprises the first shaft holding portion 71a of the first insert die 63 and the first shaft holding portion 71b of the second insert die 64. The first shaft holding portion 71 is continuously contact with the outer surface of the exposed portion of the metal shaft 5. AS illustrated in FIG. 8, the first shaft holding portion 71 comprises a first arc-shaped portion and a second arc-portion, which cover the exposed metal shaft 5 between the seal surface 54 and the concave portion 46 of the first collar 41.

As illustrated in FIGS. 7B and 8, the second shaft holding portion 72 is disposed between the throttle valve 3 and the second collar 42, which holds the exposed portion of the metal shaft 5. The second shaft holding portion 72 comprises the second shaft holding portion 72a of the first insert die 63 and the second shaft holding portion 72b of the second insert die 64. The second shaft holding portion 72 is continuously contact with the outer surface of the exposed portion of the metal shaft 5. AS illustrated in FIG. 8, the second shaft holding portion 72 comprises a first arc-shaped portion and a second arc-portion, which cover the exposed metal shaft 5 between the seal surface 55 and the concave portion 47 of the second collar 42.

The first body cavity to the third body cavity are communicated with each other. The first and the second valve cavities are isolated from the first to the third body cavities by the first shaft holding portion 71 and the second shaft holding portion 72.

The first to the third body cavities and the first and second valve cavities 71, 72 are connected with a resin material supplying apparatus (not shown). The resin material supplying apparatus includes single or multiple body gates (a first gate) at ends of a resin passage (not shown) through which a melted resin such as PPS and PBT is injected into the first to the third body cavities to form a bore wall part 21. The resin material supplying apparatus includes a pair of valve gates 67 (a second gate) at ends of the resin passage 63a through which a melted resin such as PPS and PBT is injected into the valve cavity 66 to form the semi-circle plates 51, 52 and the resin shaft 53.

Single or multiple body gates can be positioned at the bore wall 21 or the motor housing 23. As shown in FIG. 6, each of the valve gates 67 is confronting each other from opposite direction with respect to the resin shaft 53 and the metal shaft 5. Thus, melted resin can easily flow into the whole of valve cavity 66.

In order to form the throttle valve 3 and the throttle body 2 simultaneously in the same die, the body cavity 65 and valve cavity 662 are formed in such a manner that the molded throttle valve 3 is positioned in the full-opening position as shown in FIG. 1.

The movable die 62 moves toward the fixed die 61 to form the body cavity 65 and the valve cavity 66 therebetween. The melted resin, such as PPS and PBT, is injected into the body cavity 65 and the valve cavity 66 through one or more than two body gates and a pair of the valve gates 67. The first and the second shaft holding portions 71, 72 hold the metal shaft 5 at a predetermined position in the body cavity 65 and the valve cavity 66. The first and the second collar portions hold the first and the second collar 41, 42 at a predetermined position in the body cavity 65.

The inner pressure of the cavities, which is a pressure of the resin in the body cavity 65 and the valve cavity 66 is gradually increased, and the holding pressure which is higher than the maximum pressure of the injection pressure is maintained in the cavities for a predetermined period.

The injected resin in the cavities is cooled by a cooling water to be solidified. The cooling water circulates in the dies. After the resin in the dies is solidified in such manner that the throttle valve 3 can rotate in the throttle body 2, the resin molding product shown in FIG. 1 is ejected from the dies. The metal shaft 5 is insert-molded in the resin shaft 53, and the first and the second collars 41, 42 are also insert-molded in the bore wall part 21.

As follows, an operation of the electrically controlled throttle apparatus is described. When the driver steps the accelerator pedal of the vehicle, the accelerator position signal, which is transmitted from the accelerator position sensor to the ECU, changes. The ECU controls electric power supplied to the driving motor 1, so that the motor shaft of the driving motor 1 is rotated and the throttle valve 3 is operated to be in a predetermined position. The torque of the driving motor 1 is transmitted to the valve gear 8 via the pinion gear 11 and the middle reduction gear 12. Thus, the valve gear 8 rotates by a rotation angle corresponding to the stepping degree of the accelerator pedal, against urging force generated by the coil spring 4.

Therefore, the valve gear 8 rotates, and the metal shaft 5 also rotates by the same angle as the rotation angle of the valve gear 8, so that the throttle valve 3 rotates from its full close position toward its full open position. As a result, the air intake passage formed in the bore inner pipe 31 of the bore wall part 21 of the throttle body 2 is opened by a predetermined degree, so that rotation speed of the engine is changed to be a rotation speed corresponding to the stepping degree of the accelerator pedal by the driver.

When the driver releases the accelerator pedal, the throttle valve 3, the metal shaft 5, and the valve gear 8 return to an initial position of the throttle valve 3 by urging force of the coil spring 4. The initial position of the throttle valve 3 is an idling position or the full close position. When the driver releases the accelerator pedal, the value of the accelerator position signal transmitted by the accelerator position sensor becomes substantially 0%. Therefore, in this situation, the ECU can supply electric power to the driving motor 1 in order to rotate the motor shaft of the driving motor 1 in its reverse direction, so that the throttle valve 3 is controlled at its full close position. In this case, the throttle valve 3 can be rotated in the close direction by the driving motor 1. The throttle valve 3 rotates in the close direction by urging force of the coil spring 4 until the full-close stopper portion 19 provided on the valve gear 8 contacts the full-close stopper 13 integrally molded on the inner wall of the gearbox part 22 of the throttle body 2. Here, the close direction is a direction, in which the throttle valve 3 closes the air intake passage by rotating from the full open position to the full close position. Rotation of the throttle valve 3 is restricted by the full-close stopper 19 at the full close position of the throttle valve 3. Therefore, the throttle valve 3 is maintained in the predetermined full close position, i.e., idling position, in the air intake passage formed in the bore inner pipe 31. Thus, the air intake passage connected to the engine is substantially closed, so that rotation speed of the engine is set at a predetermined idling speed.

In the present embodiment, the throttle body 2 and the throttle valve 3 is integrally molded of the resin in such a manner that the throttle valve 3 is in full opened position in order that the throttle valve 3 can rotate in the bore inner pipe 31.

Figure 20:
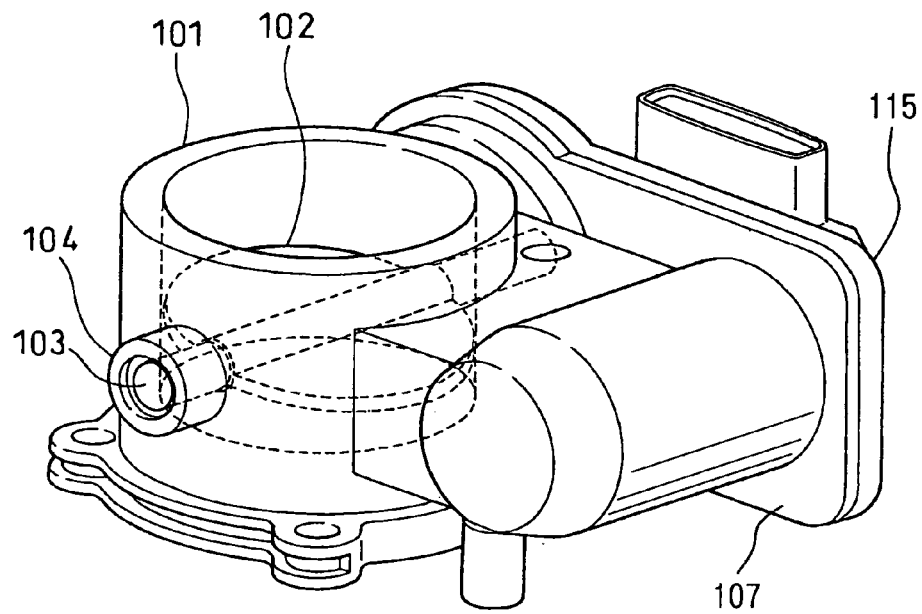
FIG. 20 is a perspective view of a conventional throttle body accommodating a throttle valve.
Figure 21:
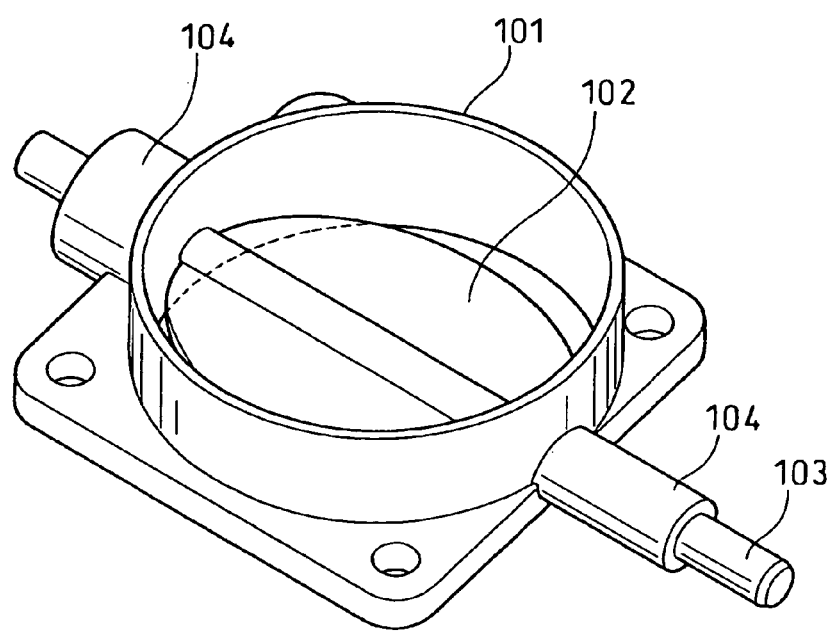
FIG. 21 is a perspective view of a conventional throttle body for explaining a conventional molding method.

In the conventional molding dies for forming the throttle apparatus shown in FIG. 20, a thin cylindrical die is needed to form a clearance between the throttle body 101 and the throttle valve 102, so that the cost of the dies and production cost are increased. However, in the present embodiment, the molding dies are needed to form the inner surface of the bore inner pipe 31 and both outer ends of the axis of the throttle valve 3. In other words, the inner surface of the bore inner pipe 31 at the vicinity of the first and the second collars 41, 42 is isolated from both ends of the axis of the throttle valve 3 by the first and the second shaft holding portions 71, 72 of the first and the second insert die 63, 64, and both exposed ends of the metal shaft 5. Therefore, the throttle valve 3 and the throttle body 2 are molded as shown in FIG. 1 at the same time in the same dies without increasing production cost.

Furthermore, the inner surface of the bore inner pipe 31 and the seal surfaces 54, 55 of the throttle valve 3 are isolated from each other by means of the first and second shaft holding portion 71, 72, and the exposed portion of the metal shaft 5. The body cavity 65 and the valve cavity 66 are isolated enough to maintain the clearance between the inner surface of the bore inner pipe 31 and the outer surface of the throttle valve 3 in a proper value, by which the product function is not deteriorated. That is, the throttle valve 3 can rotate in the bore inner pipe 31 without any interference there between. The throttle valve 3 and the metal shaft 5 are hardly stuck. When the throttle valve 3 is fully closed, the air tightness of the throttle valve 3 is not deteriorated.

When the throttle valve 3 is in the full-closed position or in the vicinity thereof, the seal surface 54, 55 confront to the concave portions 46, 47 through the predetermined clearance in the axial direction. The annular ends 56, 57 confront to the seal portions 44, 45 through the predetermined clearance in the axial direction. Thereby, the first and the second shaft holding portions 71, 72 surely hold the exposed portion of the metal shaft 5.

The metal shaft 5 is insert molded in the resin shaft 53, and the seal surfaces 54, 55 of the throttle valve 3 is isolated from the inner surface of the bore inner pipe 31 by means of the first and the second shaft holding portion 71, 72 and the exposed portion of the metal shaft 5. Thus, the throttle body 2 and the throttle valve 3 can be substantially simultaneously molded in the same dies. That is, it is avoided that throttle body 101 and throttle valve 102 are individually formed in a different dies, so that the production cost is reduced.

When the throttle valve 3 is in the full closed position or in the vicinity thereof, the seal surface 54, 55 slide on the seal portions 44, 45 to minimize the clearance between the inner surface of the bore inner pipe 31 and the axial outer ends of the throttle valve 3. Thus, the air tightness of the throttle valve 3 is enhanced to reduce the air leak when the throttle valve 3 is fully closed during engine idling. That is, the fuel economy of the engine is improved.

The first shaft holding portion 71 and the second shaft holding portion 72 restrain the melted resin from flowing into the first shaft hole 41a and the second shaft hole 42a. Thus, the throttle valve 3 can rotate in the bore wall 21 without any interference.

(Second Embodiment)

Figure 9:
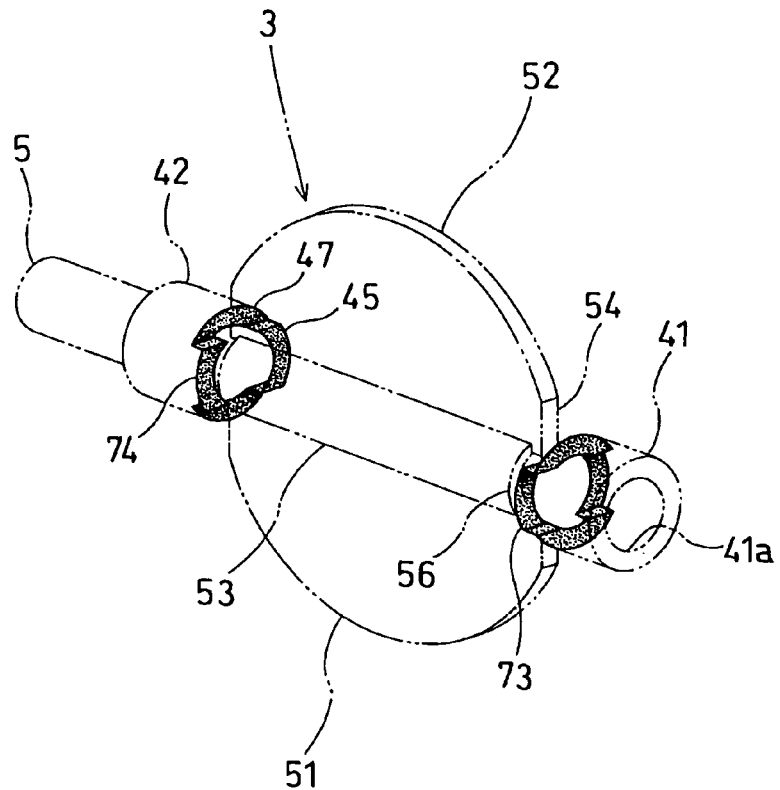
FIG. 9 is a perspective view showing the first and the second shaft holding portion according to a second embodiment.
Figure 10:
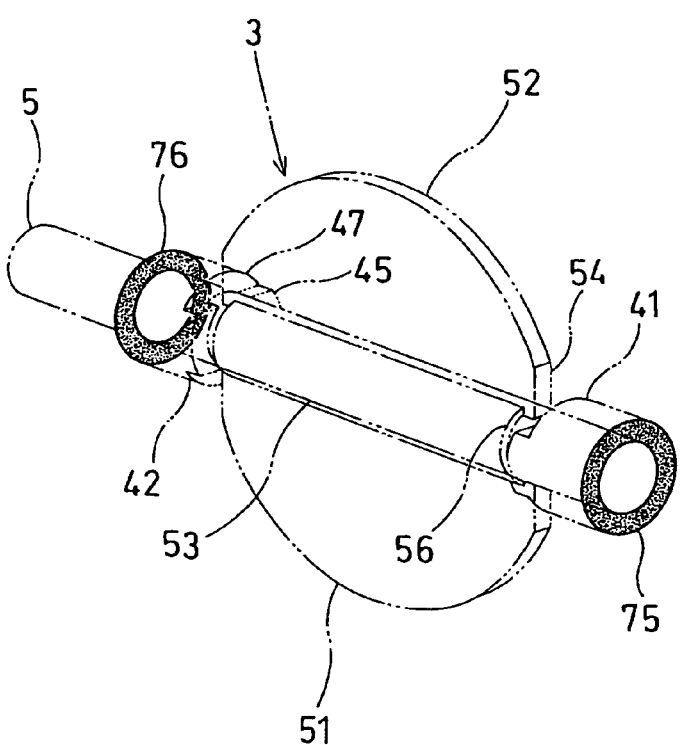
FIG. 10 is a perspective view of the first and the second shaft holding portion in viewing from the opposite side according to the second embodiment.

Referring to FIGS. 9 and 10, a second embodiment of the present invention is described.

As illustrated in FIG. 9, a first collar holding portion 73, which is closed-loop shaped, is arranged to be in contact with the inner-side of the first collar 41. A second collar holding portion 74, which is closed-loop shaped, is arranged to be in contact with the inner side of the second collar 42. Thereby, the resin flowing into the first and the second shaft hole 41a, 42a is restricted.

As illustrated in FIG. 10, a third collar holding portion 75, which is closed-loop shaped, is arranged to be in contact with the outer-side of the first collar 41. A fourth collar holding portion 76, which is closed-loop shaped, is arranged to be in contact with the outer side of the second collar 42. Thereby, the resin flowing into the first and the second shaft hole 41a, 42a is restricted, and the coaxial degree between the first collar 41 and the second collar 42 is enhanced.

(Third Embodiment)

Figure 11:
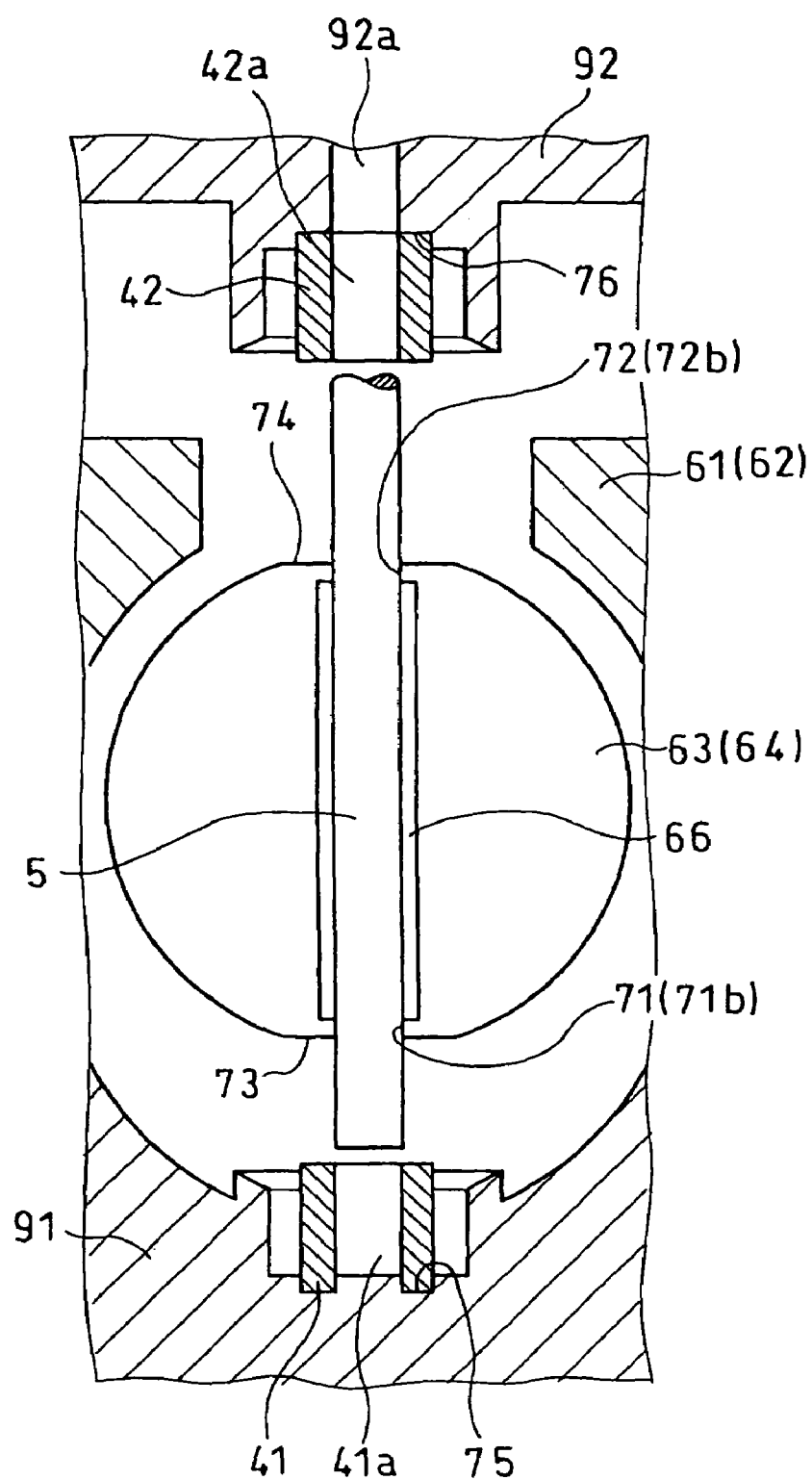
FIG. 11 is a cross sectional view of the molding dies which is opened according to a third embodiment.
Figure 12:
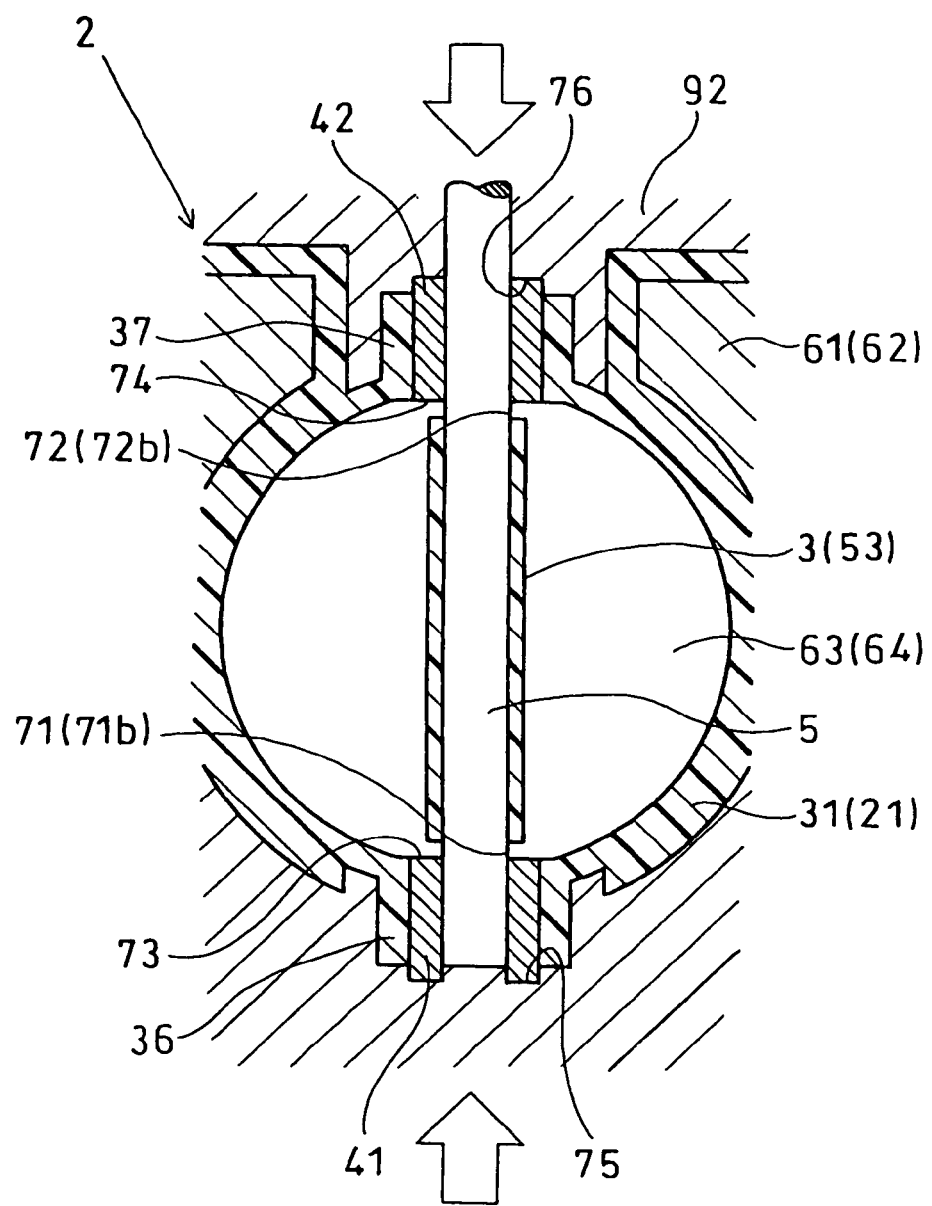
FIG. 12 is a cross sectional view of the molding dies which is closed according to a third embodiment.

Referring to FIGS. 11 and 12, the third embodiment is described. FIG. 11 shows a molding dies which are opened. FIG. 12 shows a molding dies which are closed.

The resin molding dies comprises a fixed die 61 and a movable die 62 which is displaceable upwardly and downwardly relative to the fixed die 61. The fixed die 61 includes a first insert die 63, and the movable die 62 includes a second insert die 64. A parting line of the fixed die 61 and the first insert die 63 is arranged on the rotational axis of the throttle valve 3. The movable die 62 includes a first and a second slide cores 91, 92 which are displaceable relative to the movable die 62 and the fixed die 61. The movable die 62 includes a slide core (not shown) for forming an undercut portion 29 of the stay 27. A parting line of the movable die 62 and a second insert die 64 is arranged on the rotational axis of the throttle valve 3. The first slide core 91 and the second slide core 92 are symmetrically disposed with respect to the centerline of the bare wall part 21.

When the molding dies are closed, the body cavity 65 and the valve cavity 66 are formed therebetween. The molding dies according to the third embodiment includes the first shaft holding portion 71 and the second shaft holding portion 72 as well as the first embodiment. Furthermore, the molding dies include the first collar holding portion 73 and the second collar holding portion 74 as well as the second embodiment.

The first slide core 91 includes a first collar seal portion 75 for holding the first collar 41, and the second slide core 92 include a second seal portion 76 for holding the second collar 42. The second slide core 92 is provided with a hole 92a.

The first and the second collars 41, 42 are held by the first and the second seal portion 75, 76, and the metal shaft 5 is held by the first and the second shaft holding portion 71, 72. Under such an arrangement, by sliding the first and the second sliding cores 91, 92 from the position shown in FIG. 11 to the position shown in FIG. 12, the first and the second collars 41, 42 can be displaced and positioned in the axial direction of the throttle valve 3.

The first and the second collar 41, 42 are precisely positioned in the radial and axial directions, so that the shaft seal and the collar seal can be carried out as well as the first and the second embodiments. Because it is unnecessary that the first and the second collars 41, 42 are preassembled to the metal shaft 5 in advance of closing dies, the production steps are decreased to reduce the production cost.

(Fourth Embodiment)

Figure 13A:
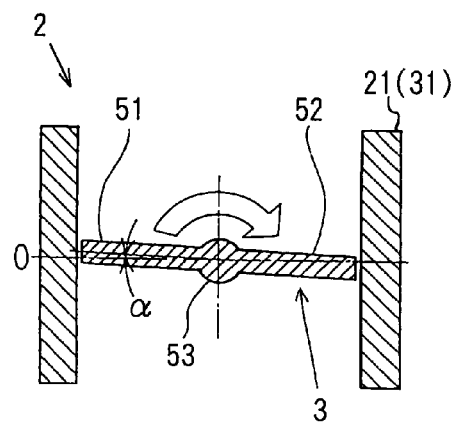
FIGS. 13A and 13B are cross sectional views of the throttle valve for explaining the position of the throttle valve according to the a fourth embodiment
Figure 13B:
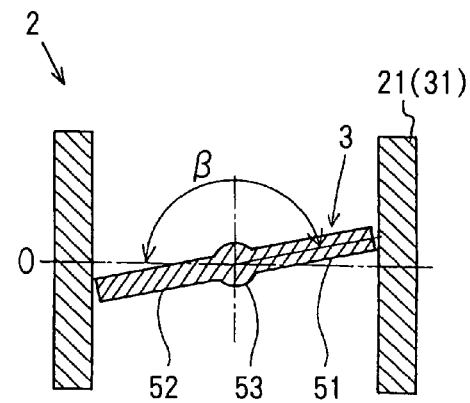

Referring to FIGS. 13A and 13B, a fourth embodiment of the present invention is described. The throttle valve 3 and the throttle body 2 are molded of a resinous material in the same molding dies. In this situation, a rotation angle (valve forming angle θ) of the throttle valve 3 is set between a rotation angle a ($\geq 0°$) corresponding to the full close position of the throttle valve 3 and a rotation angle β ($\leq 180°$) corresponding to a position of the throttle valve 3, in which the throttle valvel contacts the throttle body 2. The relation angle α, β and θ is shown by the following formula (1). Thereby, the outer periphery of the semi-circle plates 51, 52 except the first and the first surfaces 54, 55 and the inner surface of the bore inner pipe 31 can be isolated from each other by the fixed die 61 and the movable die 62.

$$\alpha < \theta < \beta \tag{1}$$

(Fifth Embodiment)

Figure 15:
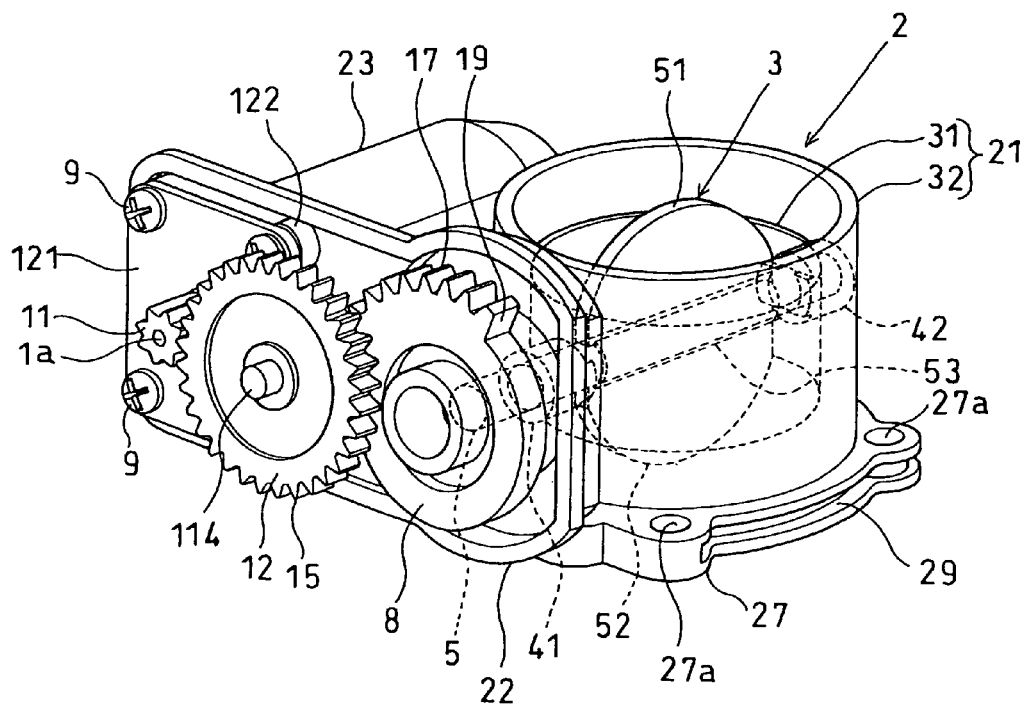
FIG. 15 is a perspective view showing a reduction gears provided to the throttle body according to the fifth embodiment.
Figure 14A:
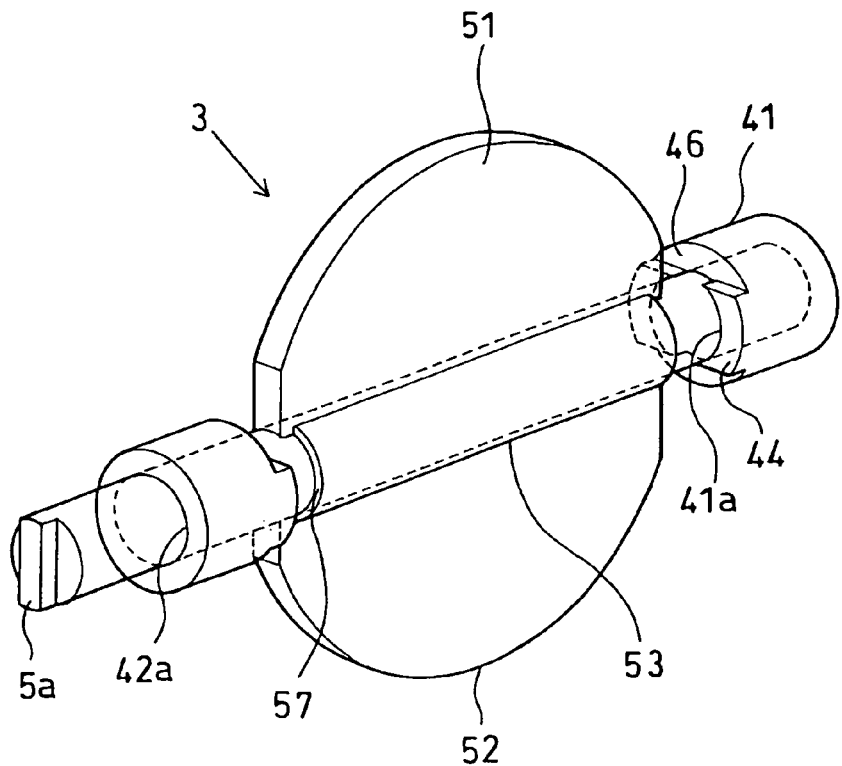
FIGS. 14A, 14B and 14C are perspective view showing a shape of an end of a throttle shaft according to a fifth embodiment.
Figure 16:
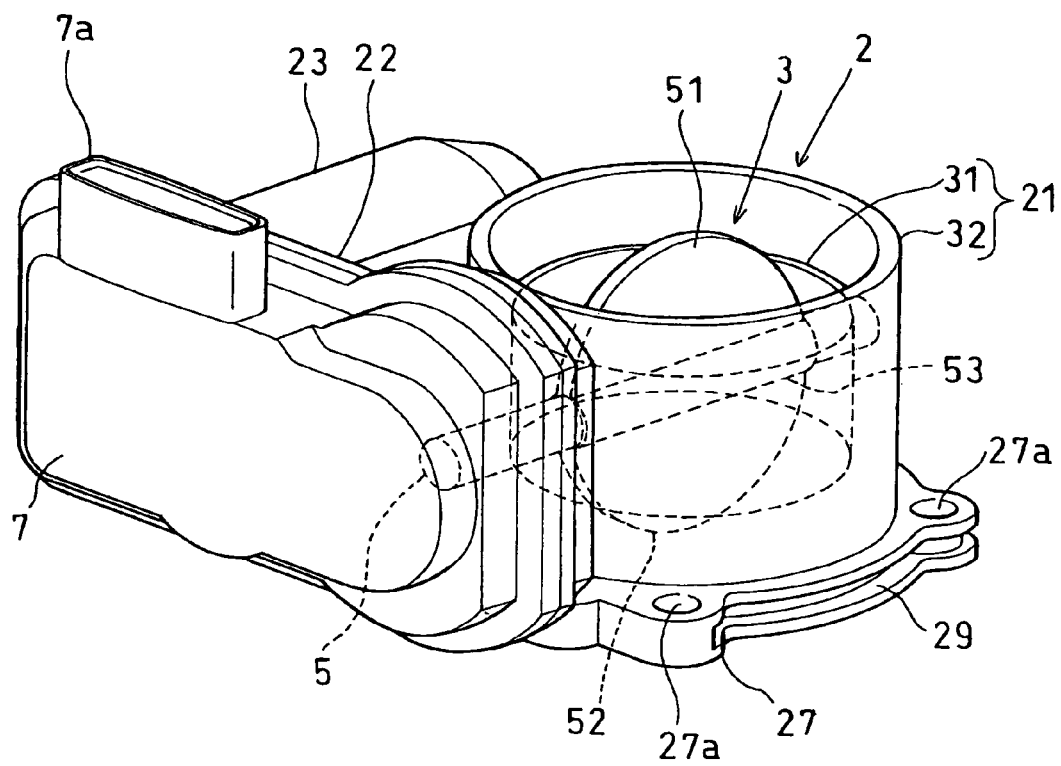
FIG. 16 is a perspective view showing a sensor cover is assembled to the throttle body according to the fifth embodiment.

Referring to FIGS. 14A to 18, the fifth embodiment is described. FIGS. 14A to 14C shows an end of the throttle shaft. FIG. 15 shows a throttle valve apparatus in which the reduction gears are assembled to the throttle body. FIG. 16 shows a throttle apparatus in which the sensor cover is assembled to the throttle body.

The gearbox part 22 accommodating the reduction gears, and the motor housing 23 accommodating the driving motor 1 are integrally molded. The second collar 42 is insert molded in the second valve bearing 37. The interior of the gearbox 22 is communicated with the bore inner pipe 41 through the second shaft hole 42a. The motor housing 23 is cylindrical shape to accommodate the driving motor 1 therein. A front-end frame 121 is secured to the motor housing 23 with a screw which is screwed at a connecting portion 122.

The reduction gears include the pinion gear 11, the intermediate gear 12, and valve gear 8 as well as the first embodiment. The intermediate gear 12 includes a large gear 15 engaging with the pinion gear 11 and a small gear (not shown) engaging with the valve gear 8. The valve gear 8 is provided with a center hole which receives one end of the metal shaft 5. The one end of the metal shaft 5 has an engaging portion shown in FIGS. 14A to 14C.

The metal shaft 5 is insert molded in the resin shaft 53 by the same way as the first embodiment. One end of the metal shaft 5 extends to the first shaft hole 41a, and the other end of the metal shaft 5 extends to the interior of the gear box 22 through the second shaft hole 42a.

The metal shaft 5 has a engaging portion 5a at one end thereof in order to keep the relative angle between the throttle valve 3 ad the metal shaft 5, to keep the relative angle between the throttle valve 3, the metal shaft 5 and the valve gear 8, and to prevent a relative rotation between the metal shaft 5 and the valve gear 8. AS shown in FIG. 5A, the engaging portion 5a is a strait protrusion which is parallel to the centerline of the bore wall part 21 when the throttle valve 3 is full opened.

Figure 14B:
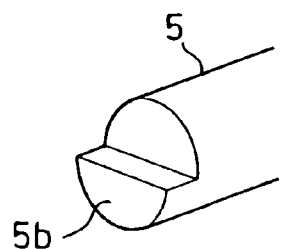

FIG. 14B shows another engaging portion 5b which comprises a semi-circle protrusion and a semi-circle concave portion. When the throttle valve is fully opened, a strait line between the protrusion and the concave portion is perpendicular to the centerline of the bore inner pipe 31.

Figure 14C:
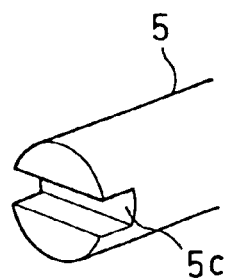

FIG. 14C shows another engaging portion 5c which is a straight groove which is perpendicular to the direction in which the semi-circle plates 51, 52 extend from the resin shaft 53. When the throttle valve 3 is fully opened, the engaging groove 5c is perpendicular to the centerline of the bore inner pipe 31.

Figure 17:
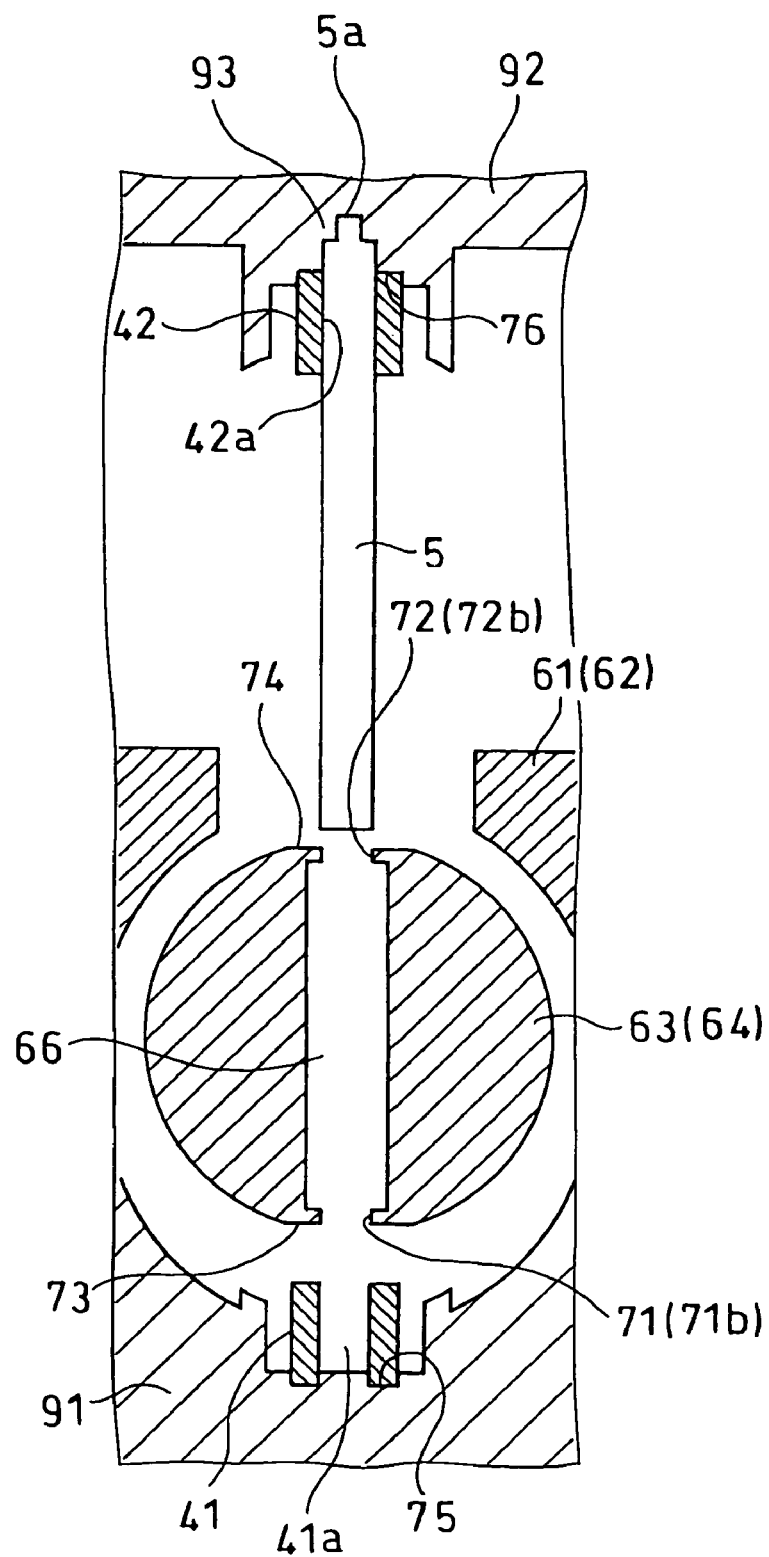
FIG. 17 is a cross sectional view of the molding dies which is opened according to the fifth embodiment.
Figure 18:
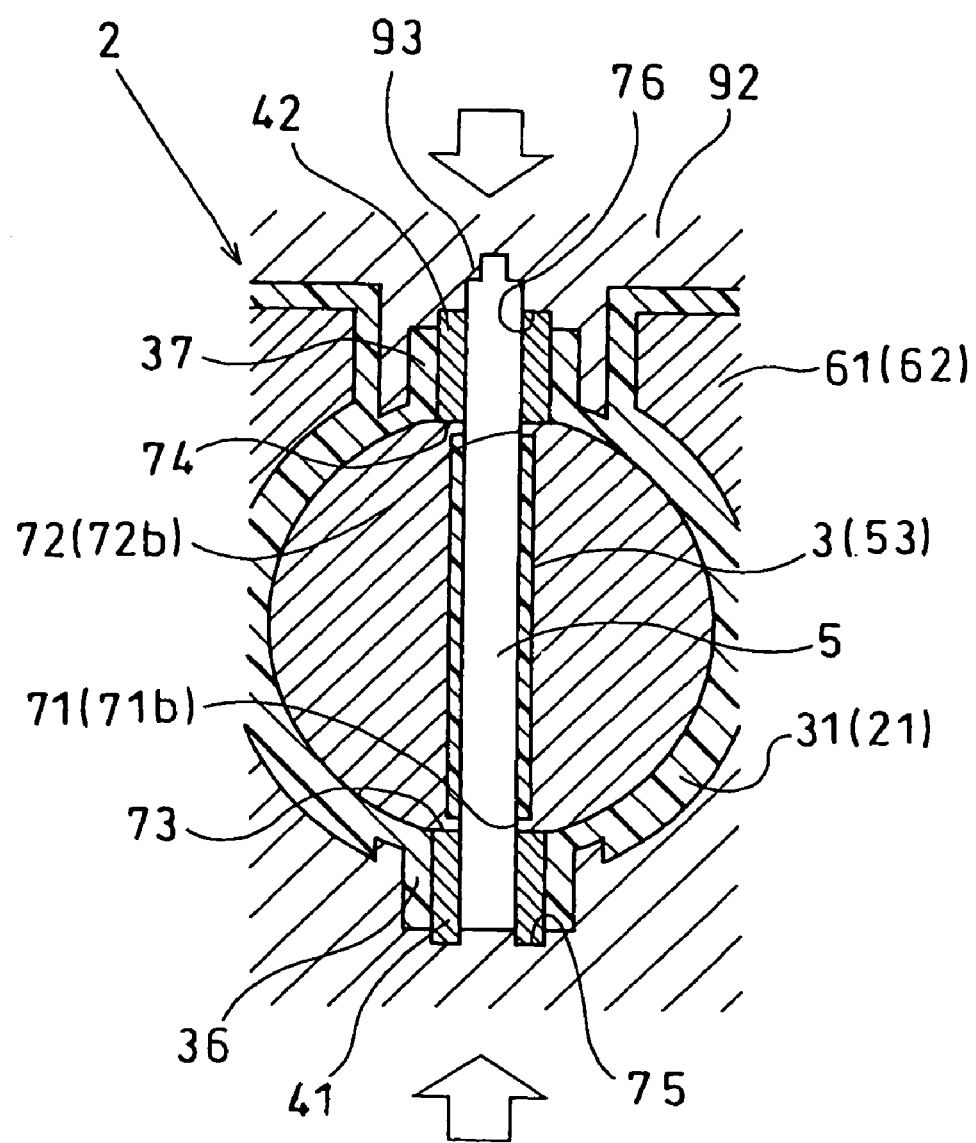
FIG. 18 is a cross sectional view of the molding dies which is closed according to the fifth embodiment.
Figure 19:
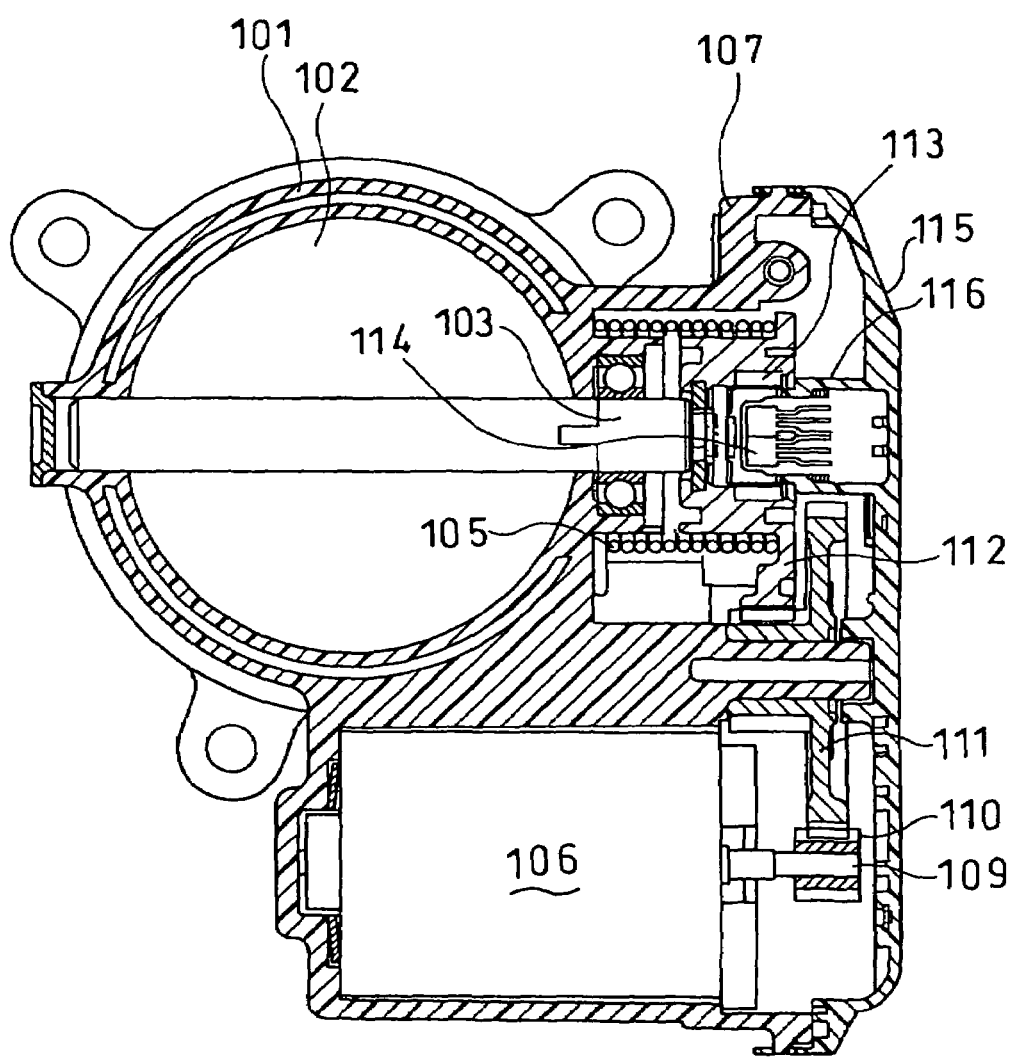
FIG. 19 is a cross sectional view of a conventional throttle apparatus.

Referring to FIGS. 17 and 18, the molding method is described. FIG. 17 shows a molding dies which are opened, and FIG. 18 shows the molding dies which are closed.

The molding dies forms the body cavity 65 as well as the third embodiment. The second slide core 92 includes a shaft engaging portion 93 to receive the engaging portion 5a to 5c.

The first and the second collars 41, 42 are held by the first and the second seal portion 75, 76, the metal shaft 5 is held by the first and the second shaft holding portion 71, 72, and the engaging portion 5a to 5c is engaged with the shaft engaging portion 93. Under such an arrangement, by sliding the first and the second sliding cores 91, 92 from the position shown in FIG.17 to the position shown in FIG. 18, the first and the second collars 41, 42 can be displaced and positioned in the axial direction of the throttle valve 3.

The first and the second collar 41, 42 are precisely positioned in the radial and axial directions, and the rotational angle between the throttle valve 3 and the metal shaft 5 is maintained predetermined value.

The coil spring 4 is displaced by the same way as the first embodiment. After the driving motor 1, the pinion gear 11 and the intermediate gear 12 are assembled to the gearbox 22 and the motor housing 23, the sensor cover 7 is secured to the gearbox portion 22 with a rivet, a screw, or thermal crimp. The magnetic detector is assembled confronting to the inner surface of the yoke.

Since the metal shaft 5 is insert molded in the throttle valve 3 in a predetermined angle, the throttle valve 3 and the valve gear 8 are assembled in a predetermined angle by engaging the engaging portion 5a, 5b, 5c with the engaging hole disposed in the valve gear 8. Thus, the assembling accuracy of the throttle valve 3 to the valve gear 8 is enhanced. The assembling hour of the valve gear 8 to the metal shaft 5 is reduced.

As shown in FIG. 15, the valve gear 8 is integrally provided with a stopper 19 for defining a full-closed position of the throttle valve 3. Thus, the full closed position of the throttle valve is easily defined. The valve gear 8 is urged to be contact with the full-close stopper 13 by the coil spring 4. If the throttle valve 3 is not properly assembled to the valve gear 8, the throttle valve 3 is hardly positioned in a proper full-closed position to obtain a predetermined idle speed of the engine. In the present embodiment, the throttle valve 3 can be positioned in the proper full-closed position to keep a predetermined clearance between the inner surface of the bore inner pipe 3 and the outer periphery of the throttle valve 3. Furthermore, the magnets 6 disposed on the inner surface of the valve gear 8, and magnetic detector hold on the sensor cover 7 are assembled in a predetermined arrangement. Thus, the accuracy of the assembling the magnetic detector to the throttle valve 3 is enhanced.

The throttle control apparatus in this embodiment conducts PID feedback control as well as the first embodiment. The rotational degree of the throttle valve 3 and the position of the magnetic detector has a predetermined relationship, so that the output adjusting hours to apply the electric signal to the rotational degree of the throttle valve 3 can be reduced.

(Modification)

The aforementioned embodiment, the throttle valve 3 is rotated by the driving motor 1. The present invention can be applied to a mechanical throttle apparatus in which the accelerator pedal is mechanically connected to the throttle valve 3 through a wire cable.

The valve holding part of the metal shaft 5 has a knurled portion in order to firmly connect the metal shaft 5 to the throttle valve 3. The metal shaft 5 and the resin shaft 53 can have width across flats to restrict relative rotation there between.

Before molding, mold release agent or lubricant, such as fluorine resin and molybdenum disulfide can be applied to both ends of the metal shaft 5.

In the aforementioned embodiment, the bore inner pipe 31 and the bore outer pipe 32 have the same center axis. The center axes of bore pipes 31, 32 can be offset to each other.

The bore wall 21 can be single pipe construction.

The aforementioned embodiment includes a blockade recess parts (moisture trapping groove) 34, 35 for blocking moisture. Only blockade recess part 34 can be provided.

The throttle apparatus can include a bypass passage which bypasses the throttle valve 3, and further include an idle speed control valve in the bypass passage to control the amount of the air introduced into the engine. An outlet of a positive crankcase ventilation (PCV) device or a purge tube can be connected to the intake manifold upstream of the bore wall 21. In such an arrangement, the blockade recess part 34 blocks the oil mist and the deposit to restrict a defective operation of the throttle valve 3 and the metal shaft 5.

The axis of the throttle valve 3 is made of material which is not melt and mixed to the resin material of the throttle valve 3 and the throttle body 2, such as ceramics. The firs collar 41, the second collar 42 can be replaced by a dry bearing as the insert part. A resin shaft as the throttle valve shaft can be used instead of the metal shaft 5. The bore wall 21, the gearbox part 22, the motor housing 23, the first and the second semi-circle plates 51, 52 and the resin shaft 53 can be made of a composite material, such as PBTG30 (polybutylene terephthalate including grass fiber by 30%).

The throttle apparatus can be made of aluminum alloy or magnesium alloy.

One end surface or both end surfaces of the semi-disc plates 51, 52 engage with a stopper provided on the inner surface of the bore inner pipe 31 so that the rotational movement of the throttle valve 3 in the full-close direction is restricted.

The valve gear 8, which can rotate with the throttle valve 3 and the metal shaft 5, is provided with the full-open stopper. The full-open stopper engages with the full-open stopper disposed on the gearbox part 22, so that the rotational movement of the throttle valve 3 in the full-open direction is restricted. Alternatively, one end surface or both end surfaces of the semi-disc plates 51, 52 may engage with a full-open stopper provided on the inner surface of the bore inner pipe 31 so that the rotational movement of the throttle valve 3 in the full-open direction is restricted.

What is claimed is:

1. A forming method of a throttle apparatus for an internal combustion engine, the throttle apparatus including a substantially tubular throttle body and a substantially disc-shaped throttle valve, the throttle valve having an axis around which the throttle valve rotate in the tubular throttle body between a close position and an open position, the throttle valve and the throttle body being molded substantially simultaneously in same molding dies in such a manner that the throttle valve is rotated by a predetermined angle with respect to a full closed position in which the throttle valve and the throttle body define a minimum gap therebetween, the forming method of the throttle apparatus, comprising:

clamping a pair of molding dies to form a body cavity and a valve cavity therein, the body cavity being for molding a throttle body and the valve cavity being for molding a throttle valve in such a manner that the throttle valve is rotated by a predetermined angle with respect to a full closed position, so that the throttle valve is not in contact with an inner bore surface of the throttle body; and substantially simultaneously injecting a melted material into the body cavity and the valve cavity, wherein a rotational shaft rotating with the throttle valve is insert molded in the throttle valve, an insert part rotatably supporting an end of the rotational shaft is insert molded in the throttle body, and a shaft holding portion supporting the rotational shaft is provided in the molding dies, the shaft holding portion being continuously in contact with the outer surface of the rotational shaft between an axial end of the throttle valve and the insert part, said shaft holding portion defining a gap between the axial end of the throttle valve and the throttle body.

2. The forming method of a throttle apparatus according to claim 1, wherein
the throttle valve is molded in a position in which the throttle valve is full opened position.

3. The forming method of a throttle apparatus according to claim 2, wherein
the rotational shaft and the insert part are made from a material which has no compatibility and no adhesiveness to a material from which the throttle body and/or the throttle valve are made.

4. The forming method of a throttle apparatus according to claim 1, wherein
a side-surface of the insert part, which confronts the throttle valve, protrudes into an intake passage defined by the throttle body, and
one end of the rotational shaft protrudes from the axial end surface of the throttle valve and is rotatably supported in the insert part.

5. The forming method of a throttle apparatus according to claim 1, wherein
the close position is defined as a position in which a clearance between an outer periphery of the throttle valve and an inner surface of the throttle body is minimum, and
the open position is defined as a position in which a clearance between the outer periphery of the throttle valve and the inner surface of the throttle body is maximum.

6. The forming method of a throttle apparatus according to claim 5, wherein
the insert part includes a sealing portion of insert, which protrudes toward the axial end of the throttle valve,
the throttle valve include a sealing portion of valve, which protrudes toward the insert part, and
the sealing portion of insert slides on the sealing portion of valve when the throttle valve is in the close position or a vicinity thereof.

7. The forming method of a throttle apparatus according to claim 1, wherein
the insert part is a substantially tubular collar, which includes an annular end surface confronting the axial end of the throttle valve, and
the molding dies include annular collar holding portion which supports the collar in such a manner that the collar holding portion continuously surrounds the annular end surface of the collar.

8. The forming method of a throttle apparatus according to claim 7, wherein
the molding dies include a second annular collar holding portion which support the collar in such a manner that the second collar holding portion continuously surrounds the annular end surface, which is opposed side of the throttle valve, of the collar.

9. The forming method of a throttle apparatus according to claim 1, wherein
the molding dies includes a body cavity corresponding to the throttle body, a valve cavity corresponding to the throttle valve, and a valve gate for introducing a melted material into the body cavity and the valve cavity.

10. The forming method of a throttle apparatus according to claim 9, wherein
the melted material is a resin material or metallic material.

11. The forming method of a throttle apparatus according to claim 9, wherein
the melted material is a resin material,
the throttle valve is made of a composite resin material including a filler, and includes a resin disc and a cylindrical resin shaft,
the rotational shaft is a metal shaft which is insert molded in the resin shaft, the metal shaft protruding from the both end surfaces of the resin shaft.

12. The forming method of a throttle apparatus according to claim 1, wherein
the throttle valve is a butterfly valve which rotates from a close position in which an amount of an intake air is minimum to an open position in which an amount of an intake air is maximum according to an operation of an accelerator,
the butterfly valve includes a cylindrical portion of which axis is perpendicular to a centerline of the throttle body,
the rotational shaft is insert molded in the cylindrical portion in such a manner that both ends of the rotational shaft protrude from both ends of the cylindrical portion.

13. The forming method of a throttle apparatus according to claim 1, wherein
the molding dies includes a shaft engaging portion receiving one end of the shaft in order to define a relative angle between the throttle valve and the rotational shaft.

14. The forming method of a throttle apparatus according to claim 13, wherein
the throttle valve is rotated by a rotational driving means according to an operation of an accelerator,
one end of the rotational shaft protrudes from an outer surface of the throttle body through a shaft hole provided on the throttle body, and
the rotational driving means is assembled to one end of the rotational shaft after the rotational, shaft is insert molded in the throttle valve.

15. The forming method of a throttle apparatus according to claim 13, wherein
the rotational shaft is provided with a magnetic generation source, a magnetic member magnetized by the magnetic generation source, non-contact magnetic detector which detects a magnetic field to generate an electromotive force, and a throttle opening sensor,
the rotational driving means is a valve gear, which integrally includes a magnetic generation source.

* * * * *